(12) United States Patent
Yea et al.

(10) Patent No.: US 7,822,286 B2
(45) Date of Patent: Oct. 26, 2010

(54) FILTERING ARTIFACTS IN IMAGES WITH 3D SPATIO-TEMPORAL FUZZY FILTERS

(75) Inventors: Sehoon Yea, Cambridge, MA (US); Dung Trung Vo, La Jolla, CA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 499 days.

(21) Appl. No.: 11/866,476

(22) Filed: Oct. 3, 2007

(65) Prior Publication Data

US 2008/0019605 A1    Jan. 24, 2008

Related U.S. Application Data

(63) Continuation-in-part of application No. 10/964,756, filed on Oct. 14, 2004, now Pat. No. 7,346,224, which is a continuation-in-part of application No. 10/703,809, filed on Nov. 7, 2003, now abandoned.

(51) Int. Cl.
G06K 9/56 (2006.01)
G06K 9/62 (2006.01)
G06K 9/40 (2006.01)

(52) U.S. Cl. ........................ 382/260; 382/205; 382/224; 382/261; 382/268; 382/275

(58) Field of Classification Search ................ 382/224, 382/260, 261, 205, 268, 275
See application file for complete search history.

(56) References Cited

U.S. PATENT DOCUMENTS 5,398,303 A * 3/1995 Tanaka ........................ 706/45
5,933,540 A * 8/1999 Lakshminarayanan et al. ........................... 382/260
6,101,276 A * 8/2000 Adiletta et al. ............... 382/236
2005/0100241 A1 * 5/2005 Kong et al. .................. 382/268
2006/0285020 A1 * 12/2006 Shin et al. .................... 348/701

FOREIGN PATENT DOCUMENTS

JP      2009095004 A *  4/2009

OTHER PUBLICATIONS

Kong, H.—"Adaptive Fuzzy Post-Filtering for Highly Compressed Video"—IEEE—2004, pp. 1803-1806.*
Wu, J.—"An adaptive fuzzy filter for coding artifacts removal in video and image"—Zhejiang University Press, vol. 8, No. 6, May 2007, pp. 841-848.*

(Continued)

Primary Examiner—Bhavesh M Mehta
Assistant Examiner—Bernard Krasnic
(74) Attorney, Agent, or Firm—Dirk Brinkman; Gene Vinokur

(57) ABSTRACT

A method filters pixels in a sequence of images. Each image in the sequence is partitioned into blocks of pixels, and the images are processed sequentially. The energy is determined for each block of pixels in each image. The energy of each block is based on variances of intensities of the pixels in the sequence of images. A 3D fuzzy filter is applied to each current pixel in each current block during the sequential processing. The 3D fuzzy filter considers the energy of the block, and the intensities of pixels spatially adjacent and temporally adjacent to the current pixel to remove blocking and ringing artifacts.

8 Claims, 20 Drawing Sheets

OTHER PUBLICATIONS

Huang, Y.—"Adaptive MLP post-processing for block-based coded images"—IEE Proc., vol. 147, No. 5, Oct. 2000, pp. 463-473.*
Kong, H.—"Edge Map Guided Adaptive Post-Filter for Blocking and Ringing Artifacts Removal"—IEEE—2004, pp. 929-932.*
Nie, Y.—"Fast Adaptive Fuzzy Post-Filtering for Coding Artifacts Removal in Interlaced Video"—IEEE—2005, pp. 993-996.*
Kim, C.—"Adaptive post-filtering for reducing blocking and ringing artifacts in low bit-rate video coding"—Signal Processing: Image Communication 17 (2002), pp. 525-535.*
Gullu, M.K.—"Membership Function Adaptive Fuzzy Filter for Image Sequence Stabilization"—IEEE—2004, pp. 1-7.*
Nie, Y.—"The Fuzzy Transformation and Its Applications in Image Processing"—IEEE—2006, pp. 910-927.*
Nie, Y.—"Optimized Fuzzy Transformation for Image Deblocking"—IEEE—2003, pp. 541-544.*
Vo, D.—"Spatio-Temporal Fuzzy Filtering for Coding Artifacts Reduction"—Mitsubishi Electric Research Laboratories TR2007-077, Apr. 2008.*

* cited by examiner

FILTERING ARTIFACTS IN IMAGES WITH 3D SPATIO-TEMPORAL FUZZY FILTERS

RELATED APPLICATION

This application is a Continuation-in-Part application of U.S. patent application Ser. No. 10/964,756, "System and Method for Classifying Pixels," filed by Kong et al., on Oct. 14, 2004, now U.S. Pat. No. 7,346,224, which is a Continuation-in-Part of application of U.S. patent application Ser. No. 10/703,809, "System and Method for Classifying and Filtering Pixels," filed by Kong et al., on Nov. 7, 2003, now abandoned.

FIELD OF THE INVENTION

The invention relates generally to image processing, and more particularly to filtering pixels in a sequence of images according to block classifications.

BACKGROUND OF THE INVENTION

Compression is used in many imaging applications, including digital cameras, broadcast TV and DVDs, to increase the number of images that can be stored in a memory or to reduce the transmission bandwidth. If the compression ratio is high, then visible artifacts can result in the decompressed images due to quantization and coefficient truncation side effects. A practical solution filters the decompressed image to suppress the visible artifacts and to guarantee a subjective quality of the decompressed images.

Most video coding standards such as ITU-T H.26x and MPEG-1/2/4 use a block-based process. At high compression ratios, a number of artifacts are visible due to the underlying block-based processing. The most common artifacts are blocking and ringing.

The blocking artifacts appear as grid noise along block boundaries in monotone areas of a decompressed image. Blocking artifacts occur because adjacent blocks are processed independently so that pixels intensities at block boundaries do not line up perfectly after decompression. The ringing artifacts are more pronounced along edges of the decompressed image. This effect, known as Gibb's phenomenon, is caused by truncation of high-frequency coefficients due to quantization AC coefficients. Many post-processing techniques are known for reducing these coding artifacts.

Most of the prior art methods deal only with blocking noise. Those methods are not effective for ringing noise. Some methods, such as the wavelet-based methods, can suppress ringing, but cause blurring in the decompressed entire image. The prior art of fuzzy rule-based filtering method deals only with white Gaussian noise.

The above prior art methods operate individually on pixels, and apply the same filter to each pixel. Those methods do not consider the underlying content of the image, as a whole. Therefore, those filters either smooth the image excessively to eliminate the artifacts, which causes blurring, or cannot reduce the artifacts sufficiently if minimal smoothing is applied.

Another problem of those methods is the computational complexity. For example, the wavelet-based method requires eight convolution-based low-pass and high-pass filtering operations to obtain the wavelet images. Then, the deblocking operation is performed on these wavelet images to reduce the blocking artifacts. To reconstruct the deblocked image, twelve convolution-based low-pass and high-pass filtering operations are required. Thus, a total of twenty convolution-based filtering operations are required in that method. The computational cost cannot meet the requirements of real-time processing. Similar to the wavelet-based method, DCT-domain method also has high computational complexity. For low-pass filtering using a 5×5 window, twenty-five DCT operations are required for processing a single 8×8 block. Such high complexity is also impractical for real-time processing. The computational cost for the iterative method is even higher than that of the above two methods. As for the fuzzy rule-based filtering method, the iterative method requires a large number of filter parameters, and extra training data.

In view of the problems of the prior art methods, it is desired to provide a new filtering mechanism that achieves better image/video quality with a low computational complexity.

SUMMARY OF THE INVENTION

A method filters pixels in a sequence of images. Each image in the sequence is partitioned into blocks of pixels, and the images are processed sequentially.

The energy is determined for each block of pixels in each image. The energy of each block is based on variances of intensities of the pixels in the sequence of images.

A 3D fuzzy filter is applied to each current pixel in each current block during the sequential processing.

The 3D fuzzy filter considers the energy of the block, and the intensities of pixels spatially adjacent and temporally adjacent to the current pixel to remove blocking and ringing artifacts.

DETAILED DESCRIPTION OF THE PREFERRED EMBODIMENT

Figure 1:
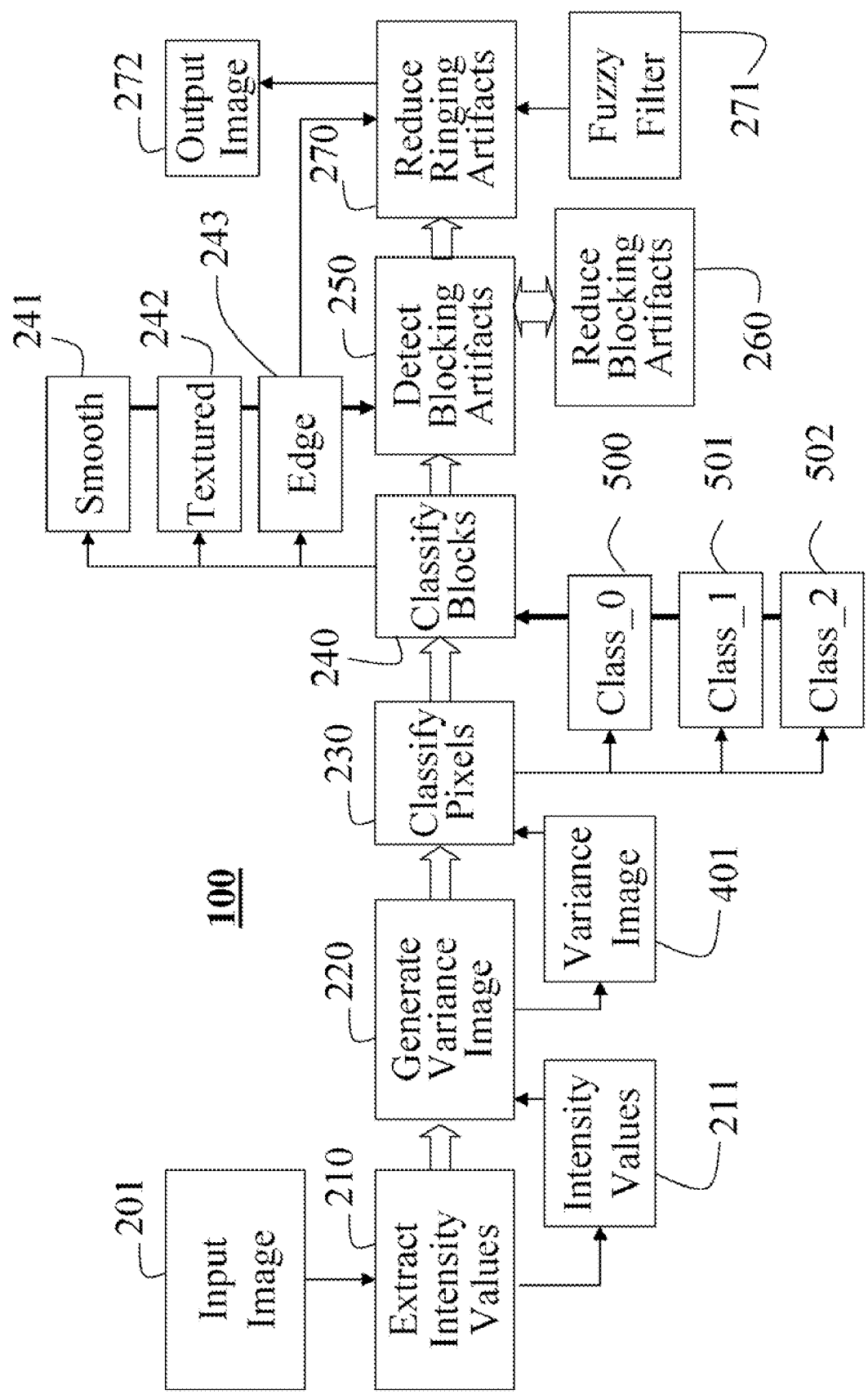
FIG. 1 is a block diagram of a method and system for reducing artifacts from a decompressed image according to the invention.

FIG. 1 shows the system and method 100 according to the invention. This system is independent of any image or video decoder. The system does not rely on any coding parameters embedded in a compressed image or video. The emphasis of our method is on local features in an image. The method according to the invention extracts local features, which are classified. The classified features can then be used to filter selectively and adaptively the pixels, if the images is a decompressed image.

The input is an image 201. The method works for any image format, e.g., YUV or RGB. It should be understood that the system can operate on a sequence of images as in a video. For example, the image 201 can be part of a progressive or interlaced video. It should also be noted that the input image can be a source image that has never been compressed, or a decompressed image.

However, if the input image is a decompressed image derived from a compressed image, and the compressed image was derived from a source image compressed with a block-based compression process, then due to the prior compression, the decompressed image 201 has blocking artifacts caused by independent quantization of DCT coefficients blocks of the compressed image. Therefore, the decompressed image 201 has block discontinuities in spatial values between adjacent blocks. Ringing artifacts are also possible along edges in the decompressed image.

In order to reduce these artifacts while preserving the original source information, the filtering according to the invention is based on a classification of local features in the input image 201. Furthermore, in one embodiment, the filtering is adaptive.

Variance Image

From a statistical perspective, a distribution of intensity values of the pixels reveals features of the decompressed image. A mean intensity value m of the image represents the DC component of the image. The mean intensity value can be measured by $$m = E\{x[i,j]\} = \sum_{\Delta i=-M}^{M} \sum_{\Delta j=-N}^{N} x[i+\Delta i, j+\Delta j] p_{x[i+\Delta i, j+\Delta j]}, \quad (1)$$

where (2M+1) and (2N+1) are the width and the height of the decompressed image region in terms of pixels used for calculating the variance corresponding to the pixel x[i,j], and $Px[i+\Delta i,j+\Delta j]$ is the probability of a pixel occurring at a location of $(i+\Delta i, j+\Delta j)$.

An average power of the decompressed image is a mean-square value $$\overline{m^2} = E\{x[i,j]^2\} = \sum_{\Delta i=-M}^{M} \sum_{\Delta j=-N}^{N} x[i+\Delta i, j+\Delta j]^2 p_{x[i+\Delta i, j+\Delta j]}, \quad (2)$$

A fluctuations about the means is the variance $$\sigma^2 = E\{(x[i,j] - m)^2\} = \quad (3)$$

$$\sum_{\Delta i=-M}^{M} \sum_{\Delta j=-N}^{N} (x[i+\Delta i, j+\Delta j] - \mu)^2 p_{x[i+\Delta i, j+\Delta j]}$$

$$= \sum_{\Delta i=-M}^{M} \sum_{\Delta j=-N}^{N} x[i+\Delta i, j+\Delta j]^2 p_{x[i+\Delta i, j+\Delta j]} - m^2 = \overline{m^2} - m^2$$

The mean-square represents an average power of DC component in the image, and the variance represents an average power of the AC frequency components in the compressed image 201. Therefore, the variance of the intensity values is used as a measure of a fluctuation AC power, which represents the energy in the image.

If the variance of energy is high for a pixel, then the pixel is likely to be associated with an edge. If the variance or energy is low, the pixel is part of a homogeneous region of the image, for example, a smooth background. Thus, the energy reveals characteristics of local features in the image.

Because both the blocking artifacts and the ringing artifacts are due to the local characteristics of features, i.e., the artifacts appear either on block boundaries or near the edges, the local features are sufficient to reveal these artifacts. Therefore, the classification and filtering according to the invention are based on the energy distribution as measured by the local variance of pixel intensity values, as stated in Equation (3) above. The feature characteristics are determined by extracting 210 intensity values 211 as follows.

Figure 3:
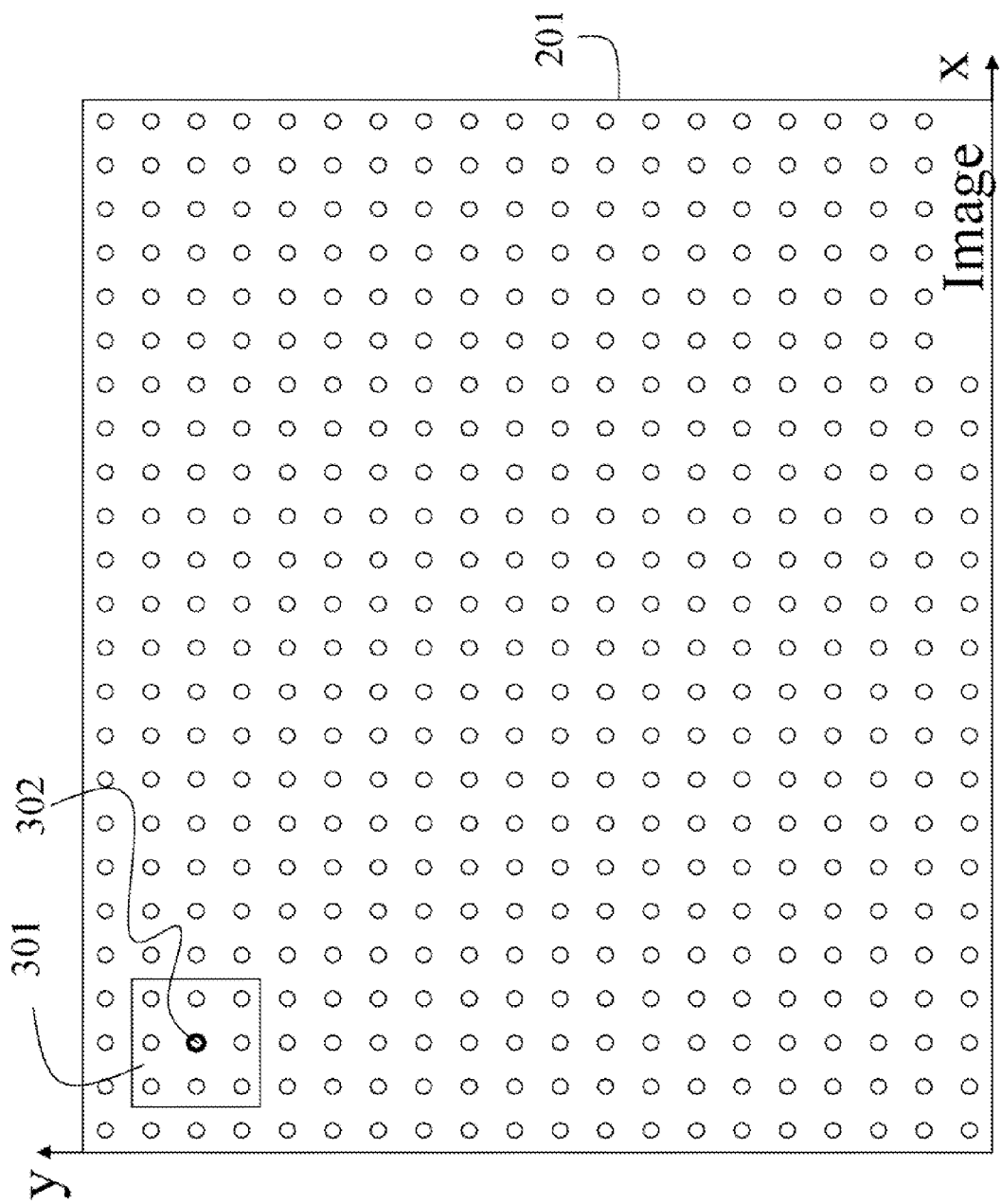
FIG. 3 is a block diagram of feature extraction according to the invention.
Figure 4:
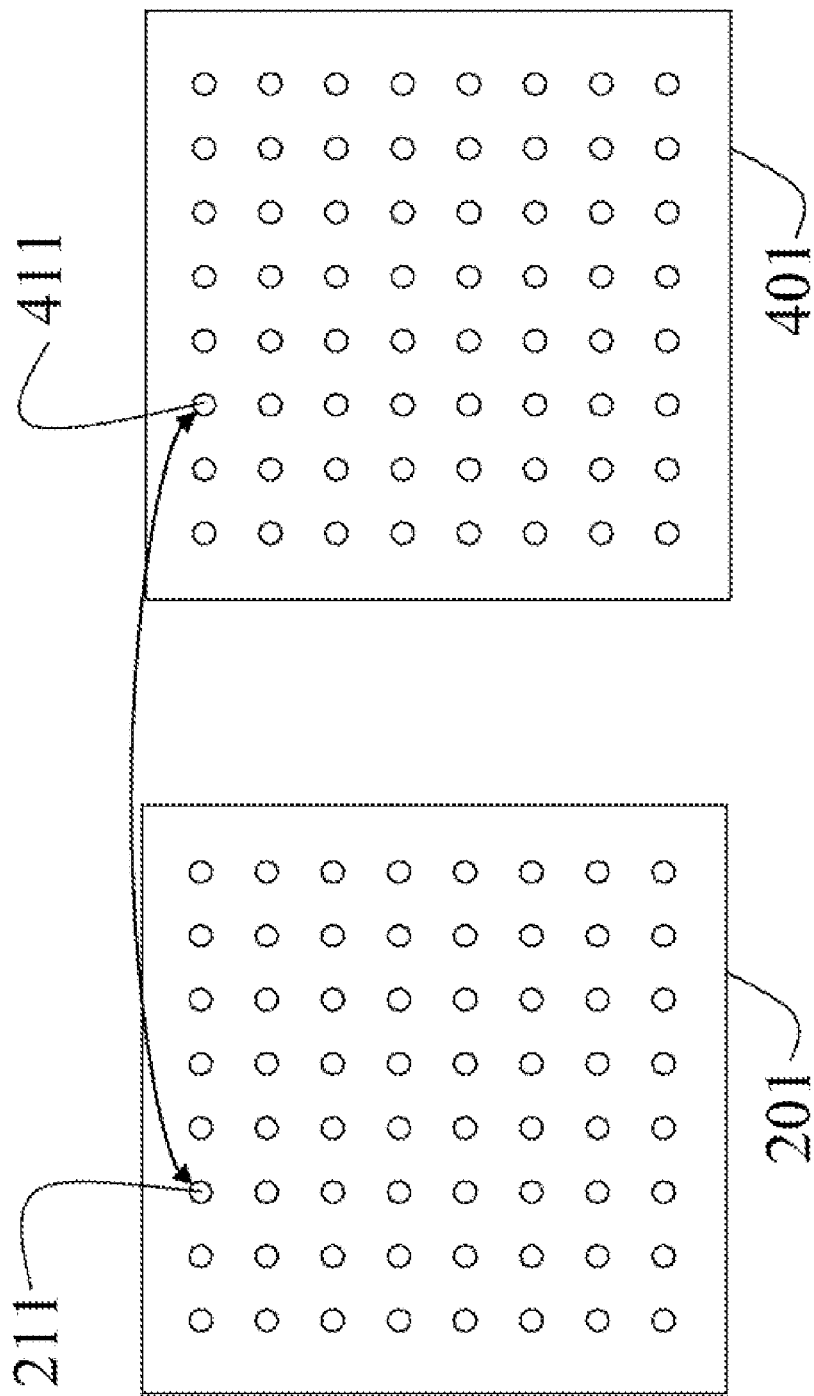
FIG. 4 is a block diagram of mapping between an intensity image and an energy image according to the invention.

As shown in FIG. 3, a smooth 3×3 filter 301 is scanned over each pixel 302 in a decompressed image 201. The scanning can be in raster scan order. The mean and the variance of the intensities values 211 are determined 220 for each central pixel 302 of the filter according to equations 1-3. The variance values from a variance or energy image 401, as shown in FIG. 4. From physical viewpoint, the local variance reflects a gradient of the decompressed image at each pixel location. It should be noted that the gradient is very high at edges in the image.

As shown in FIG. 4, the feature extraction and scanning transforms the decompressed image 201 from the spatial domain where the pixels have intensity values 211 to the variance image 401 in the energy domain where the pixels having variances 411.

Pixel Classification

Figure 5A:
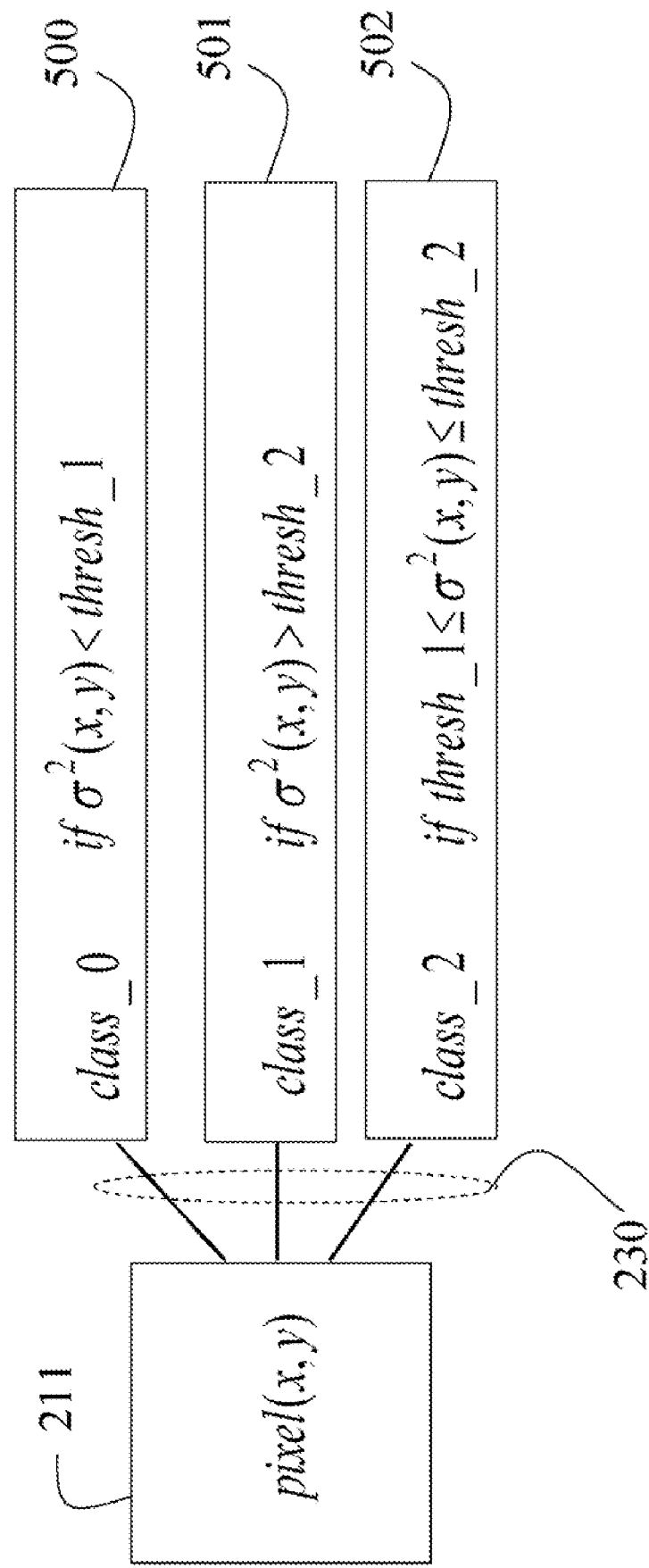
FIG. 5A is a block diagram for classifying pixels using variances of pixels intensities according to the invention.

As shown in FIG. 5A, pixels 211 with variances less than a first threshold_1 are classified 230 as class_0 500. These pixels correspond to homogeneous or 'smooth' regions in the image. Pixels with variances greater than a second threshold_2 are classified as class_1 501. These pixels most likely correspond to edges. Pixels with variances between these two thresholds are classified as class_2 502. These pixels can be considered as either ringing noise or texture depending on the characteristics of neighboring pixels. The adaptive filtering according to the invention is performed according to the above classifications.

Figure 5B:
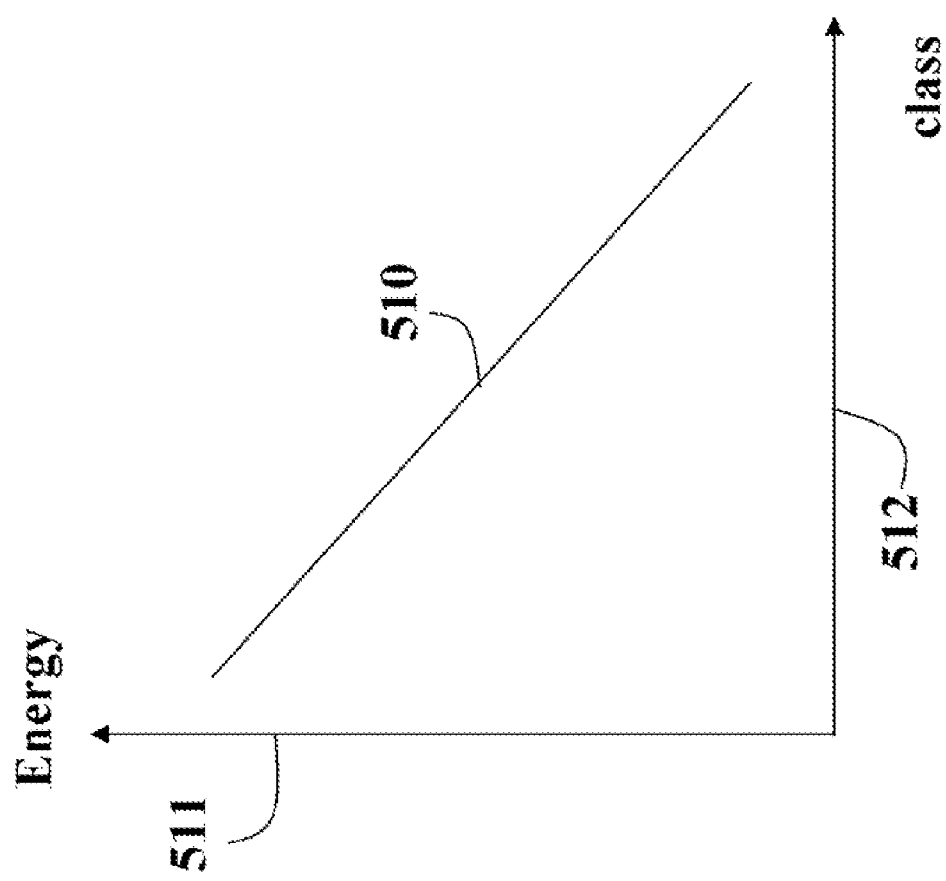
FIG. 5B is a block diagram for classifying pixels as a function of energy according to the invention.

FIG. 5B show the classification in more general terms, where a mapping 510 defines a relationship between energy 511 and block classes 512.

Block Classification

In one embodiment, the blocks of pixels are also classified 5 discretely 240 into 'smooth' 241, 'textured' 242 and 'edge' 243 blocks according to the variance values in the variance image energy 401. The block classification 240 can be based on the total variance within each block or by counting the number of pixels of each class in the block. For example, if all the pixels in the block are class_0, then the block is classified as smooth. If at least one pixel in the block is class_1, then the block is classified as an edge block. Otherwise, if the block has both class_0 and class_2 pixels, then the block is classified as a texture block. In another embodiment, the blocks are classified continuously.

Blocking Artifact Detection

Most recognized standards for compressing images and videos use are based on DCT coding of blocks of pixels. Block-base coding fully partitions the image into blocks of pixels, typically 8×8 pixels per block. The pixels of each block are transformed independently to DCT coefficients. Then, the DCT coefficients are quantized according to a predetermined quantization matrix. Due to the independent coding, the blocking artifacts are visible at the block boundaries.

Figure 6:
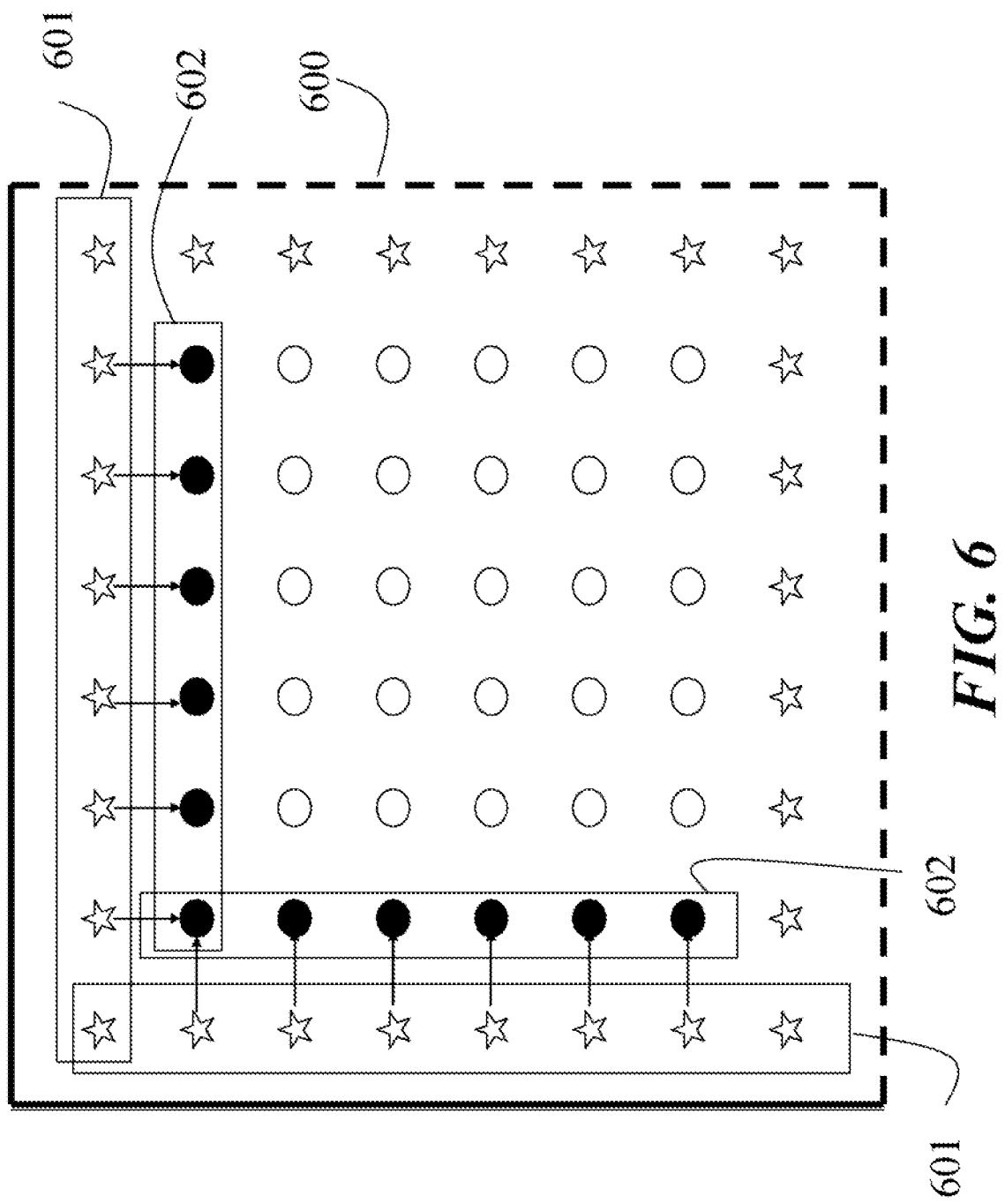
FIG. 6 is a block diagram for detecting blocking artifacts according to the invention.

FIG. 6 shows how blocking artifacts are detected 250 on an 8×8 block 600. Outer pixels are denoted by stars 601, and 'inner' pixels are denoted by black circles 602. The inner pixels are located adjacent and parallel to the top row and left column in the block. The detection 250 is performed from left to right and top to bottom for each block.

The gradients of the variances of the outer pixels 601 are most like the inner pixels 602 when blocking artifacts exist. The criterion for deciding that blocking artifact are present is $$\left| \sum_{i=1}^{6} sign(*_i - \bullet_i) \right| \geq 5 \quad (4)$$

sign is either +1 or −1. The above test distinguishes between blocking artifacts and edges on block boundaries.

Deblocking Filter

Figure 7:
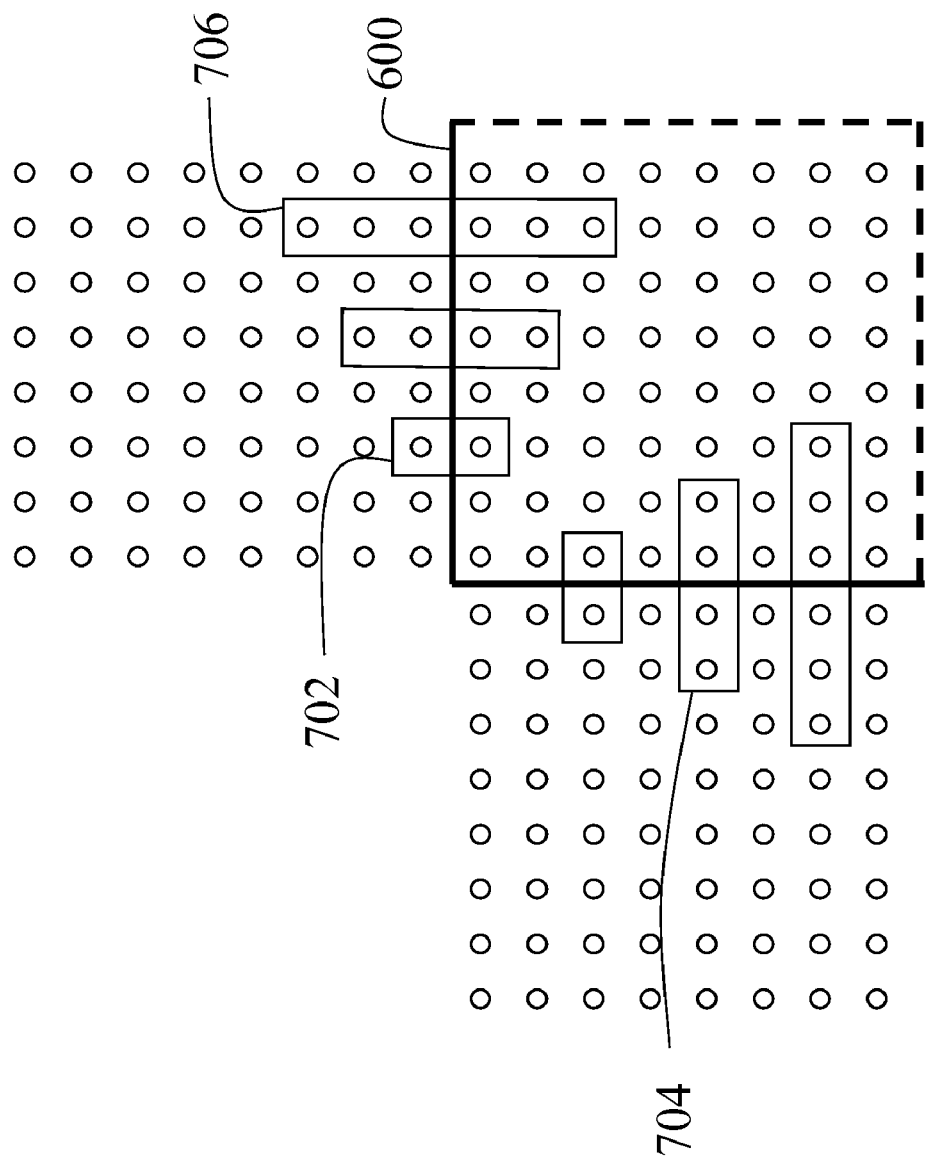
FIG. 7 is a block diagram for filtering blocking artifacts according to the invention.

As shown in FIG. 7, the blocking artifacts are reduced 260 by filtering detected block boundaries in the decompressed image. If a blocking artifact is detected, a one-dimensional low-pass (smoothing) filter is adaptively applied to pixels along block boundaries 600. Sizes of the filters 702, 704, 706, e.g., two, four, six or more pixels, correspond to the gradients at the block boundaries. Pixels with large gradient values, i.e., edge pixels, are excluded from the filtering operation to avoid blurring edges or textures.

Fuzzy Filter

The deringing 270 operates only on edge block 243 by applying a fuzzy filter 271. In a fuzzy transformation, a relationship between spatial sample $x_i$, e.g., a pixel intensity value, and an order static $x_j$ is established by a real-valued Gaussian function µq(a, b), where is a spatial index i=1, 2, . . . , N,j=1, 2, . . . , N is an order statistic, $x_{(1)} \leq x_{(2)} \leq \ldots \leq x_{(N)}$, and a size of the filtering window is N.

The membership function has the following constraints:

$$lim_{|a-b| \to 0} \mu_F(a,b)=1;$$

$$lim_{|a-b| \to \infty} \mu_F(a,b)=0; \text{ and}$$

$$|a_1-b_1| \leq |a_2-b_2| \Rightarrow \mu_F(a_1,b_1) \geq \mu_F(a_2,b_2).$$

This yields a N×N fuzzy spatial-rank (SR) matrix, which is defined by $$\tilde{R} = \begin{bmatrix} \tilde{R}_{1,(1)} & \cdots & \tilde{R}_{1,(N)} \\ \vdots & \ddots & \vdots \\ \tilde{R}_{N,(1)} & \cdots & \tilde{R}_{N,(N)} \end{bmatrix} \quad (5)$$

where $\tilde{R}_{i,(j)} = \mu_F(x_i, x_{(j)}) \in [0,1]$, i,j=1,2, . . . N.

Because elements of the fuzzy SR matrix $\tilde{R}$ are dependent on a difference of values between each pair of pixels, the fuzzy SR matrix contains spread information embedded in the observed pixels.

The original or 'crisp' spatial pixel can be 'transformed into fuzzy spatial pixels by multiplying a crisp order statistics vector with a row normalized fuzzy SR matrix. The resulting fuzzy spatial pixels also reflect the spread information. The output 272 of the fuzzy filter 271 according to the invention is the fuzzy counterpart of a center pixel in the filtering window.

The filter output can be obtained using the following simplified formula $$y = \tilde{x}_c = \frac{\sum_{j=1}^{N} x_{(j)} \mu_F(x_c, x_{(j)})}{\sum_{j=1}^{N} \mu_F(x_c, x_{(j)})} = \quad (6)$$

$$\frac{\sum_{j=1}^{N} x_j \mu_F(x_c, x_j)}{\sum_{j=1}^{N} \mu_F(x_c, x_j)} = \frac{x_c + \sum_{j=1, j \neq c}^{N} x_j \mu_G(x_c, x_j)}{1 + \sum_{j=1, j \neq c}^{N} \mu_G(x_c, x_j)},$$

where $x_c$ and $\tilde{x}_c$ are the crisp and fuzzy center pixel, respectively.

As implied by the final expression of the filter output, an ordering operation is unnecessary. Thus, the computational complexity of the fuzzy filter 271 is only slightly higher than that of the linear filter. The only extra computation is for evaluating the function values between N−1 pairs of pixels. Note that µF($x_c$, $x_c$)=1 for all pixels, and thus need not to be determined.

In one embodiment of the invention, the real-valued function µ_G(a, b) is defined by a Gaussian function $e^{-(a-b)^2/2\xi^2}$, where a spread parameter ξ is twenty.

Figure 2:
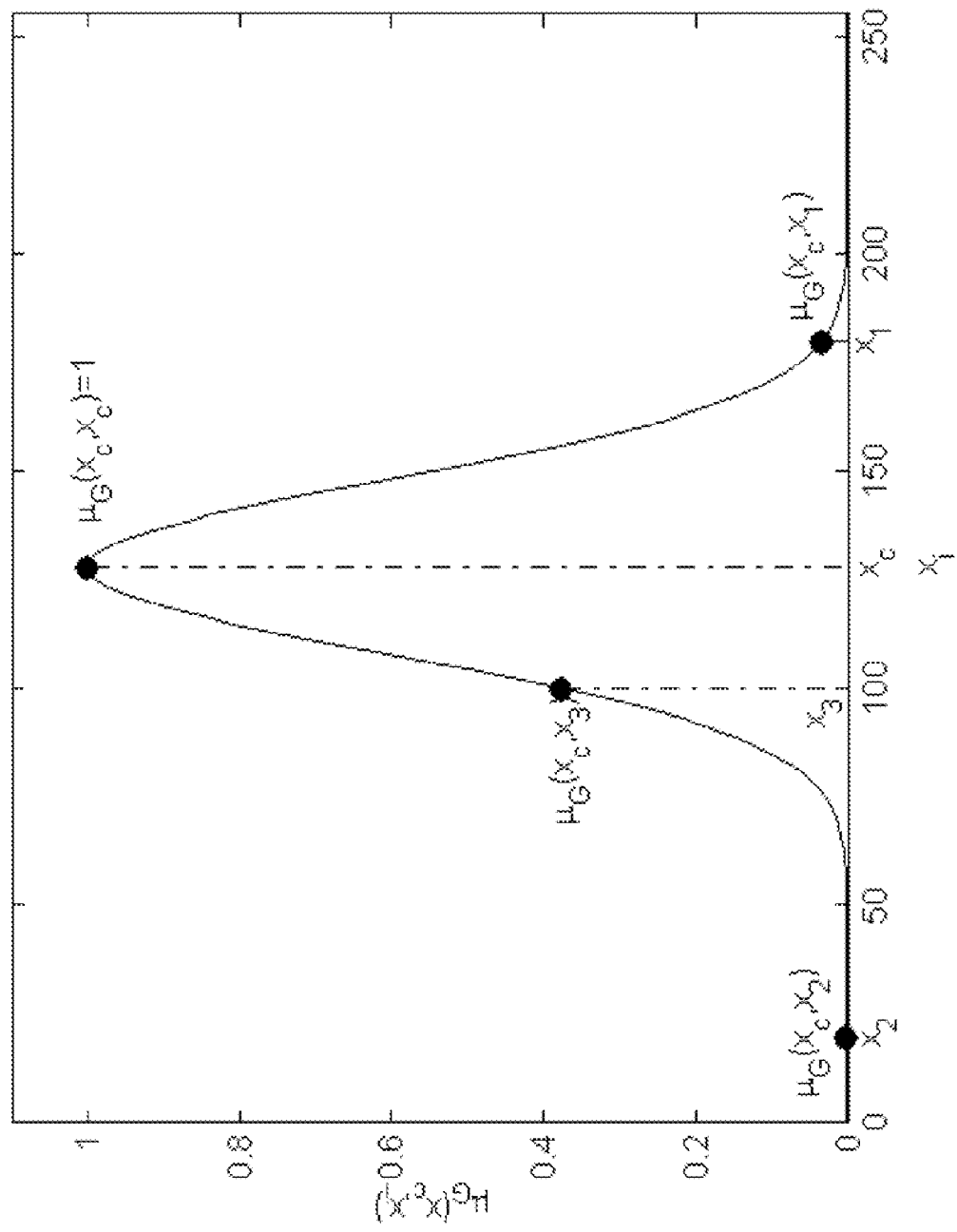
FIG. 2 is a graph of a Gaussian function for evaluating pixel value affinities and generating fuzzy filter parameters according to the invention.

FIG. 2 shows some example values of the Gaussian function, which represents the value affinity between a sample $x_i$(i=1,2, . . . , N) and the window center sample $x_c$. In the given example, $x_c$=128, $x_1$=180, $x_2$=20, $x_3$=100.

From the above expression, we can see that the fuzzy filter output is a weighted average of the samples in the filtering window. The Gaussian function value, i.e., the affinity measure of each sample to the center sample, including the center sample itself, is used as the weight of the corresponding sample.

Thus, the closer the sample value is to the center sample, the larger weight is assigned to the sample. This leads to the effect that the similarly valued samples are further clustered around their local mean, while disparately valued samples are substantially the same. This is known as the clustering property of the fuzzy transformation.

As the result, the fuzzy filter 271 according to the invention has a data-adaptive smoothing feature, and thus can perfectly preserve strong-edges, while reducing weak-edges associated with annoying ringing artifacts.

Figure 8:
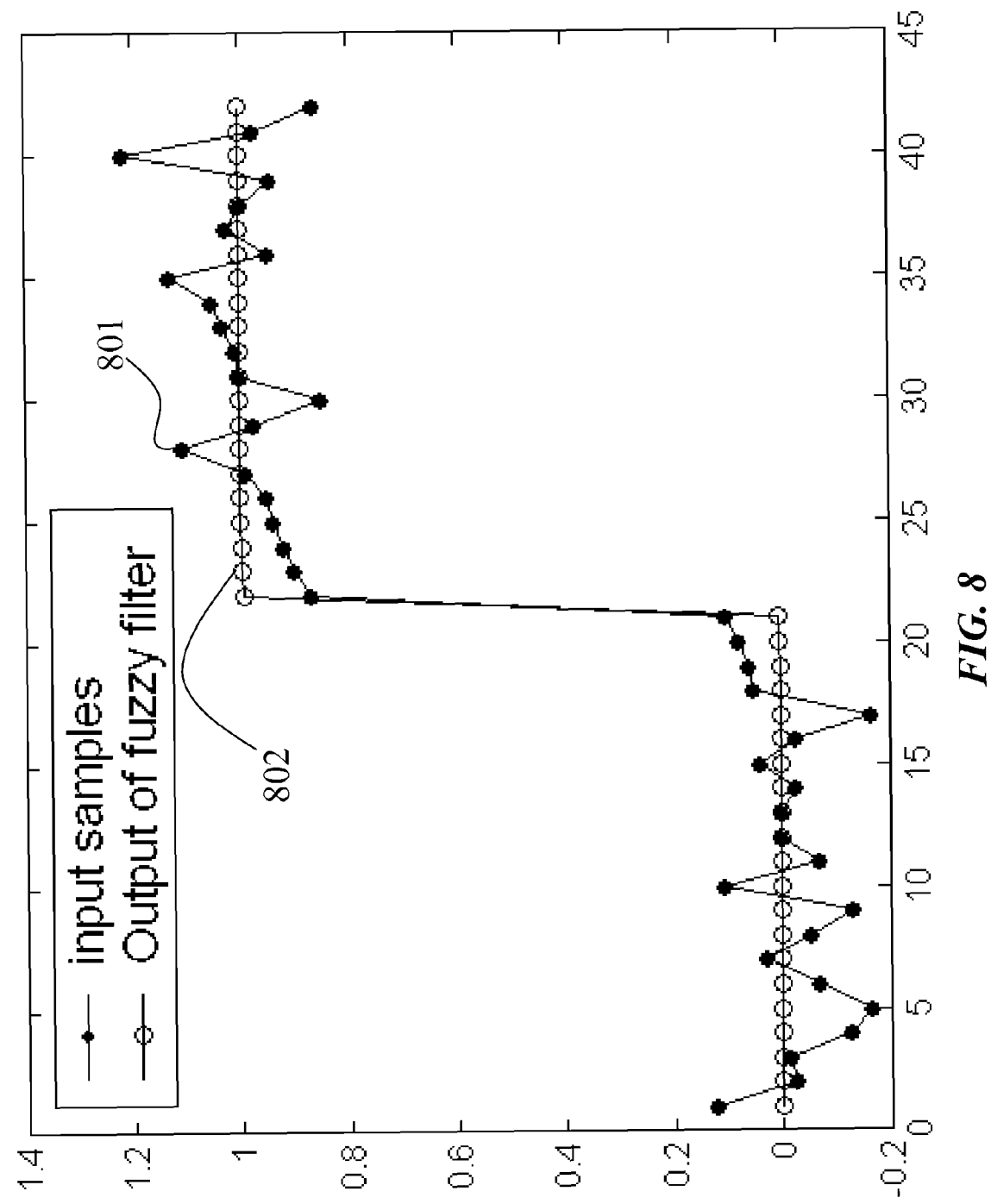
FIG. 8 is a graph showing data-adaptive smoothing property of a fuzzy filter according to the invention.

FIG. 8 shows this feature. In this example, input samples of 'step' signal 801 are corrupted by uniformly distributed noise The corrupted signal is thus constituted by two groups of crisp samples, one group is localizes around zero, and the other ground around one.

After filtering by the fuzzy filter 271, each group including similarly valued samples, is more tightly clustered around a local mean of the group, resulting in a filtered step signal 802. Thus, the undesirable perturbations in the uniform regions are smoothed, while the step edge is restored. Note that this example exactly simulates the ringing artifacts around a strong-edge. Therefore, the example demonstrates how the fuzzy filter reduces these artifacts and preserves the edge as well.

Spatio-Temporal Fuzzy Filter

Typically, conventional deblocking and deringing methods only use information from within one image, even if the image is an image in a sequence of images or images. This is the obvious simple processing. That is, only the information in the current image is considered, and information from other images is not considered when filtering a particular image. Often, this comprises visual quality, especially in an image sequence of a scene with moving objects, such as a video of a real world scene. The quality is compromised because the spatial filtering does not maintain temporal consistency across the image sequence.

Our idea is that the subjective and the objective qualities of a decompressed video can be significantly improved if information from temporally adjacent images (frames) is considered. In other words, our filtering considers both spatial information that can be obtained from within each image, as well as temporal information obtained from adjacent images. Therefore, we provide a 3D fuzzy filter. The three dimensions are x, y, and t.

The 3D fuzzy-filter can be constructed by accounting for the spatio-temporal relationship in the definition of spatial-rank orders and spread information. Extra information from a 3D set of pixels that include the current and adjacent images enhances the clustering characteristic of our fuzzy filter, while still preserving edges in images.

We use a set of $(T^-+1+T^+)$ images for our filtering, i.e., a set of $T^-$ previous images, the current image, and a set of $T^+$ next images. Note, that $T^-$ and $T^+$ can be different. For a current pixel $I(t, m, n)$ of the current image, the fuzzy filter is applied to a set of $(T^-+T^++1) \times (2M+1) \times (2N+1)$ pixels spatially and temporally adjacent to a current pixel $I(t,m,n)$ to form the filtered pixel $I(t,m,n)$, where t indicates temporal dimension, and m, n the spatial dimensions. It should be noted that these adjacent pixels form an input vector $$I_l = [I_0, I_1, \ldots ,$$
$$I_{(T^-+T^++1) \times (2M+1) \times (2N+1)-1}] = [I(-T^-, -M, -N), \ldots , I(T^+, M, N)].$$

The equivalent rank vector is $$I_{(1)} = [I_{(0)}, I_{(1)}, \ldots , I_{((T^-+T^++1) \times (2M+1) \times (2N+1)-1)}], \text{ where}$$

$$I_{(0)} \leq I_{(1)} \leq \ldots \leq I_{((T^-+T^++1) \times (2M+1) \times (2N+1)-1)}.$$

The output of the spatio-temporal filter assigned to the current pixel is $$I'(t, m, n) = \qquad (7)$$

$$\frac{\sum_{l=0}^{(T^-+T^++1) \times (2M+1) \times (2N+1)-1} I_{(l)}(t, m, n) \times \mu_G(I(t, m, n), I_{(l)})}{\sum_{l=0}^{(T^-+T^++1) \times (2M+1) \times (2N+1)-1} \mu_G(I(t, m, n), I_{(l)})} =$$

$$\frac{\sum_{\Delta t=-T^-}^{T^+} \sum_{\Delta m=-M}^{M} \sum_{\Delta n=-N}^{N} I(t, m, n) \times \mu_G(I(t, m, n), I(t+\Delta t, m+\Delta m, n+\Delta n))}{\sum_{\Delta t=-T^-}^{T^+} \sum_{\Delta m=-M}^{M} \sum_{\Delta n=-N}^{N} \mu_G (I(t, m, n), I(t+\Delta t, m+\Delta m, n+\Delta n))},$$

where $\mu_G(a,b)$ is a Gaussian membership function defined by $\mu_G(a,b) = e^{-(a-b)^2/2\sigma^3}$, and $\sigma$ is the spread parameter.

Energy Image for 3D Spatio-Temporal Fuzzy Filter

Because the classification and filtering according to the invention are based on the energy distribution in images as measured by the local variance of pixel intensity values, equations (1) through (3) are modified as follows when 3D spatio-temporal filtering is applied.

The mean intensity value is $$m = E\{x[t, i, j]\} \qquad (8)$$
$$= \sum_{\Delta t=-1}^{1} \sum_{\Delta i=-M}^{M} \sum_{\Delta j=-N}^{N} x[t+\Delta t, i+\Delta i, j+\Delta j]p_{x[t+\Delta t, i+\Delta i, j+\Delta j]},$$

where the subscript t represents the temporal index, and $\Delta t=-1$, $\Delta t=0$, and $\Delta t=+1$ correspond respectively to the previous, current and next image. Similarly, the mean-square value as given by equation (2) now is $$\overline{m^2} = E\{x[t, i, j]^2\} = \qquad (9)$$
$$\sum_{\Delta t=-1}^{1} \sum_{\Delta i=-M}^{M} \sum_{\Delta j=-N}^{N} x[t+\Delta t, i+\Delta i, j+\Delta j]^2 p_{x[t+\Delta t, i+\Delta i, j+\Delta j]}.$$

Then the corresponding variance is $$\sigma^2 = E\{(x[t, i, j] - m)^2\} = \qquad (10)$$
$$\sum_{\Delta t=-1}^{1} \sum_{\Delta i=-M}^{M} \sum_{\Delta j=-N}^{N} (x[t+\Delta t, i+\Delta i, j+\Delta j] - m)^2$$

$$p_{x[t+\Delta t, i+\Delta i, j+\Delta j]} =$$
$$\sum_{\Delta t=-1}^{1} \sum_{\Delta i=-M}^{M} \sum_{\Delta j=-N}^{N} x[t+\Delta t, i+\Delta i, j+\Delta j]^2$$
$$p_{x[t+\Delta t, i+\Delta i, j+\Delta j]} - m^2 = \overline{m^2} - m^2$$

Figure 16:
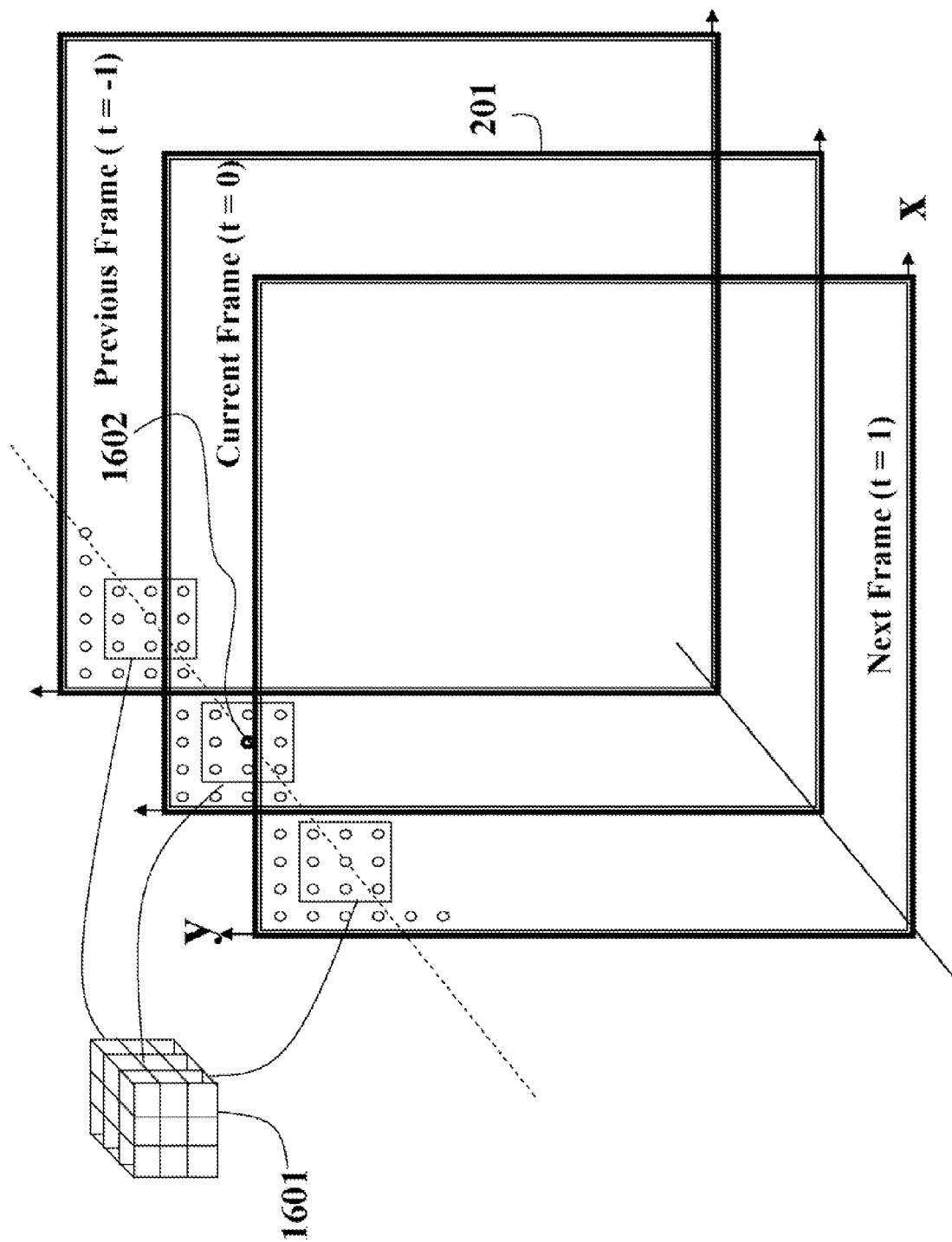
FIG. 16 is a schematic of 3D filtering according to an embodiment of the invention.

As shown in FIG. 16, a fuzzy 3×3×3 filter 1601 is 'scanned' over each pixel 1602 in the decompressed current image 201 using temporally as well as spatially adjacent pixels. Note the range of the temporal index t in the above equations and FIG. 16 can be adjusted according to the availability of the decompressed adjacent images as well as memory and complexity constraints.

Figure 18:
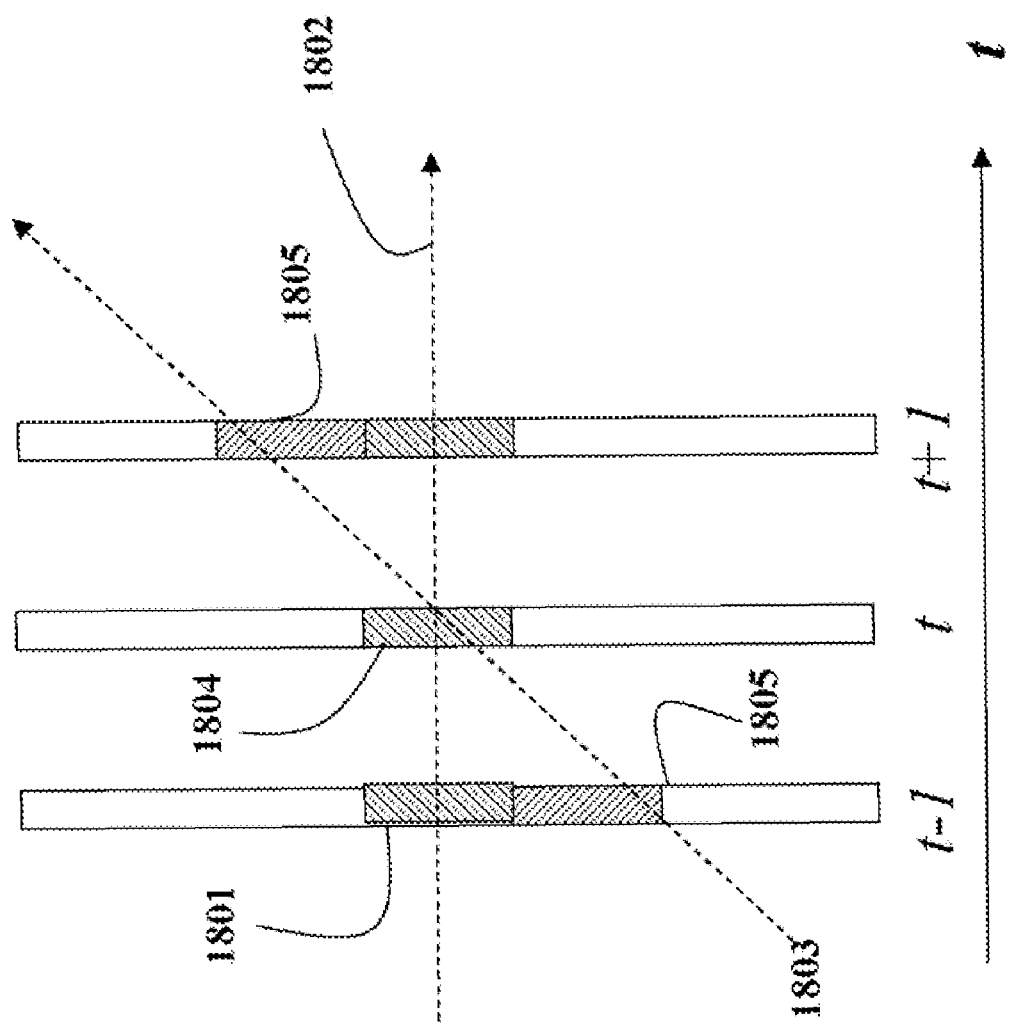
FIG. 18 is block of spatially and temporally adjacent blocks according to an embodiment of the invention.

As shown in FIG. 18, the blocks 1801 considered in previous and next images do not need to be colocated 1802 spatially along the time dimension. For example, the blocks can be shifted in the spatial domain. In this case, a motion vector 1803 of the current block 1804 can indicate which blocks need to be considered during the classification and the filtering. The motion vector generally indicates dependencies between previous and next blocks 1805, and the current block 1804.

Chrominance Filtering

The deblocking and deringing method described so far can be applied to chrominance (U, V) components of the video in the same manner as to luminance (Y). This removes the blocking as well as the ringing artifacts. The ringing artifacts usually appear as color mismatches in the decompressed video.

However, in the 2D deringing case, the benefit of chrominance filtering cannot be fully reaped because an insufficient number of chrominance samples, which are often sub-sampled before compression. This is because deringing as described herein relies on the 'clustering' property of the fuzzy filter, which tends to require more samples than 'smoothing', which is another property of the fuzzy filter that enables deblocking.

However, the 3D filtering according to one embodiment of the invention incorporates more samples from neighboring frames. Therefore, the 'clustering' property of the fuzzy filter can take full effect, and a better color-match can be achieved.

Adaptive Filtering

It can be seen from the Equations (6) and (7) that the fuzzy center pixel in the window is a weighted average. Each weight is given by the Gaussian function, particularly as defined by the spread parameter $\xi$. The spread parameter controls the shape of the Gaussian function, i.e., the coverage of the filtering. If the spread parameter $\xi$ is large, then the Gaussian function is relatively wider. This corresponds to a smoother filter. If the spread parameter $\xi$ is small, then the Gaussian function is narrow, and the smoothness of the filtering is decreased. The window size N has a similar characteristic. A large window has a stronger smoothing effect than a small window. Note, the window as well as the temporal span can be asymmetric.

It should be noted, that the window is also referred to as the filter 'kernel' or the filter "footprint." Both of these are also related to the spread parameter of the filter.

Therefore, we provide an adaptive 3D fuzzy filtering method. The window size N and the spread parameter $\xi$ are determined adaptively according to the values in the variance image 401, which is reflected in the block classification. Note, the window size can be asymmetric.

There are four possible combinations of window size N and spread parameter $\xi$:
  a. small window N and small $\xi$;
  b. small window N and large $\xi$;
  c. large window N and small $\xi$; and
  d. large window N and large $\xi$.

Our basic rule is that that a small variance or energy corresponds to a small window and a small spread parameter $\xi$, and a large variance or energy corresponds to a large window and large spread parameter $\xi$.

Figure 9A:
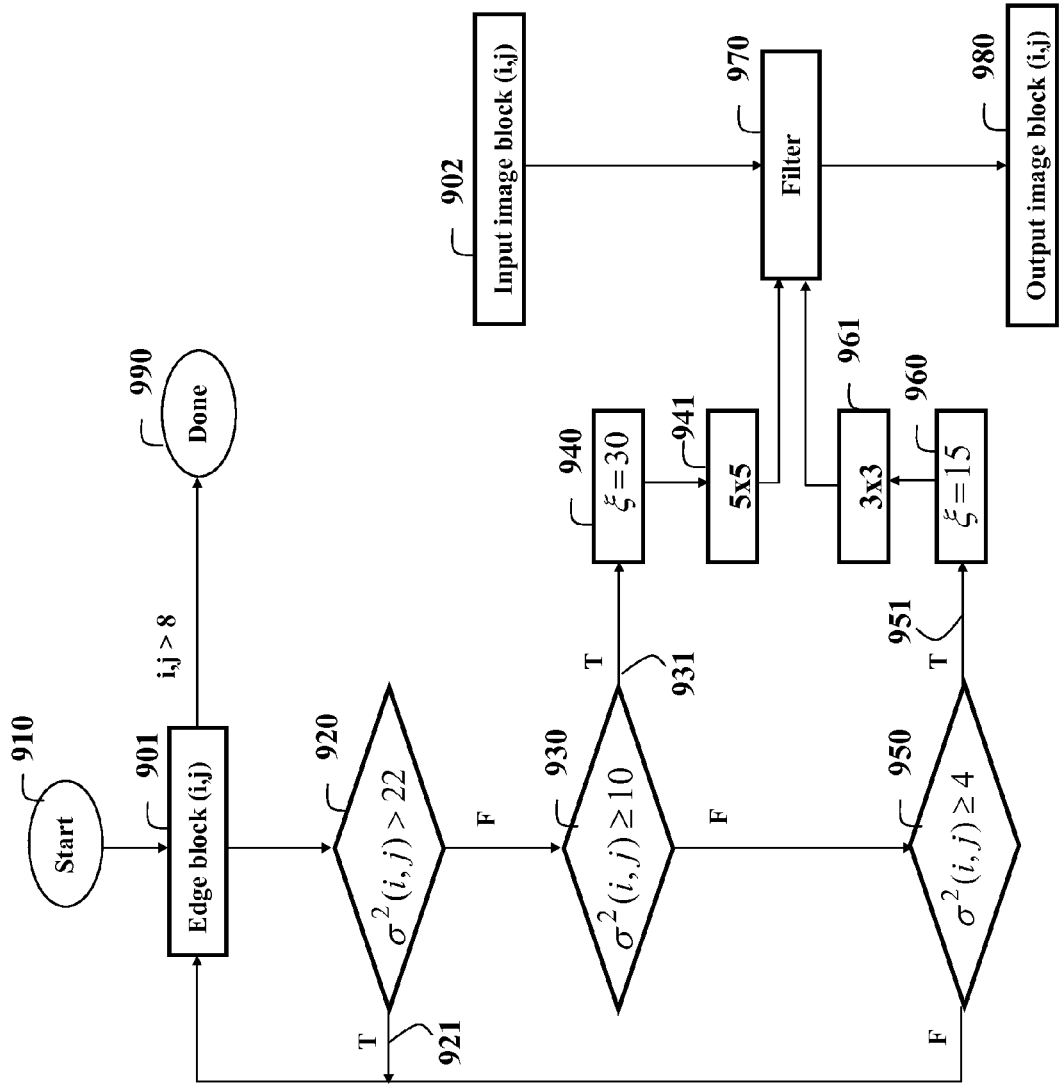
FIG. 9A is a block diagram of adaptive filtering as a function of variance and discrete filter sizes according to an embodiment of the invention.

FIG. 9A shows the steps of the adaptation method according to the invention. At the start 910, the input to the method is an next classified block 901, until done 990, and a corresponding decompressed image block 902.

In step 920, we determine whether a variance value is greater than twenty-two. If true 921, then it likely that the corresponding pixel is part of an edge. Therefore, to retain the sharpness of the edge, this pixel is all-pass filtered. In the basic fuzzy filtering, as described above, every edge pixel is filtered by the same filter having the same spread parameter.

Otherwise, if false, step 930 determines if the variance value is less than twenty-two and greater than or equal to ten. If true 931, then the image pixel is probably corrupted by ringing noise and we select a large spread parameter 940, $\xi$ is thirty 30, and a large window size 941, N is 5×5, i.e., a strong smooth fuzzy filter, is used for the filtering 970 to reduce maximally the ringing artifacts.

Otherwise, if false, step 950 determines if the variance is less than ten and greater than or equal to four. If true 951, then the corresponding image pixel is in a 'weak' edge area, or may be corrupted slightly by the ringing noise. In this case, a small spread parameter 960, $\xi$ is fifteen, and a small window 961, N is 3×3, i.e., a weak smooth fuzzy filter, is used for the filtering 970. Otherwise, if the variance is less than four, the image pixel is in a smooth region, and all-pass filtering is applied, and the next pixel is processed. After all pixels are processed, the filtered block is output 980, and the next block 901 is processed until done 990.

It should be noted, that various discrete limit values for the variance, window, and spread parameter, e.g., (22, 10, 4), (5, 3), and (30, 15) can be changed for different applications and still be within the spirit and scope of the invention.

Figure 9B:
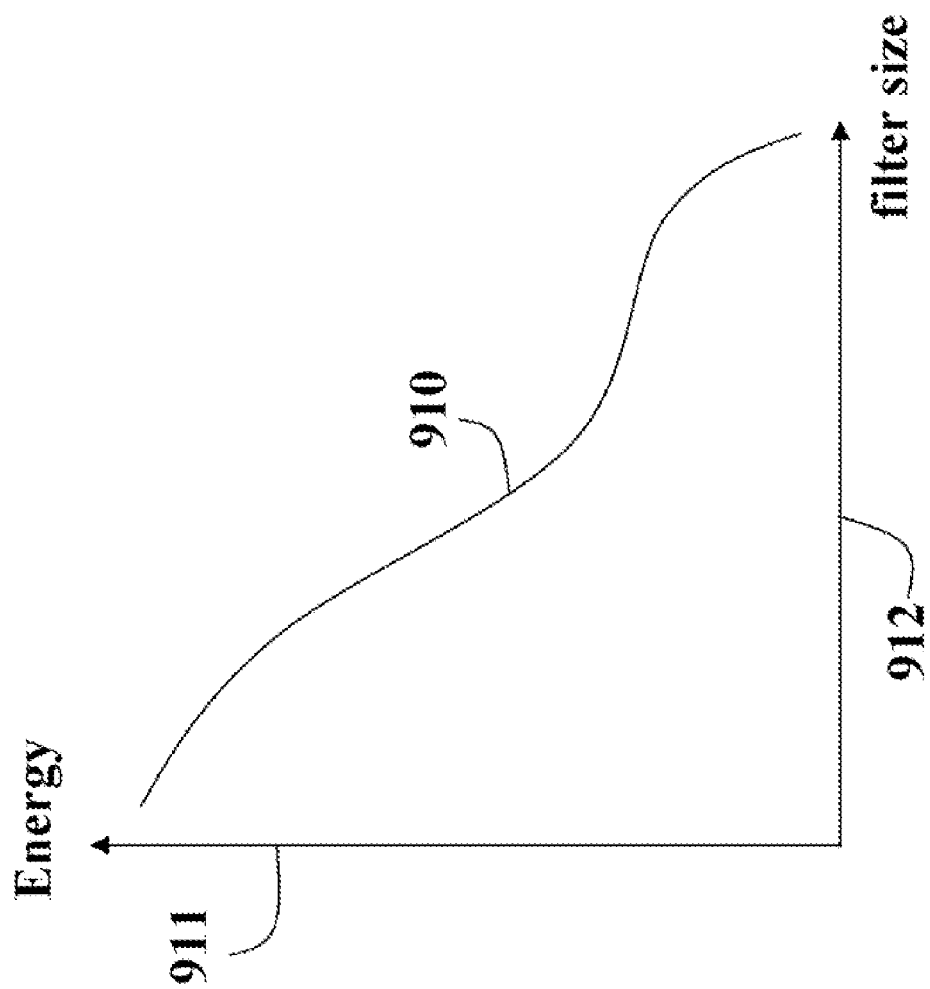
FIG. 9B is a block diagram of adaptive filtering as a function of energy and continues filter size according to an embodiment of the invention.

FIG. 9B shows a mapping 910 between 911 energy and filter size 912, which is continuous. If the energy is relative high, we use a relatively smooth filter with a large window size to preserve local energy, such as pixels associated with edges. If the energy is relatively low, then we use a sharp filter with a small window size to remove noise and other small scale artifacts. Thus the size of our filter is proportional to the local energy in the 3D neighborhood of the image that is being filtered.

Improved Deblocking

In a conventional interlaced video, a single image can be coded jointly with image-based and field-based coding scheme. This increases the complexity of the artifacts. To achieve better artifacts reduction and better detail preservation, the two fields of each video image are processed separately by our invention. Vertical and horizontal deblocking are performed using different schemes. A 1-D adaptive fuzzy filter with different window size is applied to reduce the horizontal and vertical blocking artifacts, respectively.

Detecting Vertical Blocking Artifacts

Figure 10:
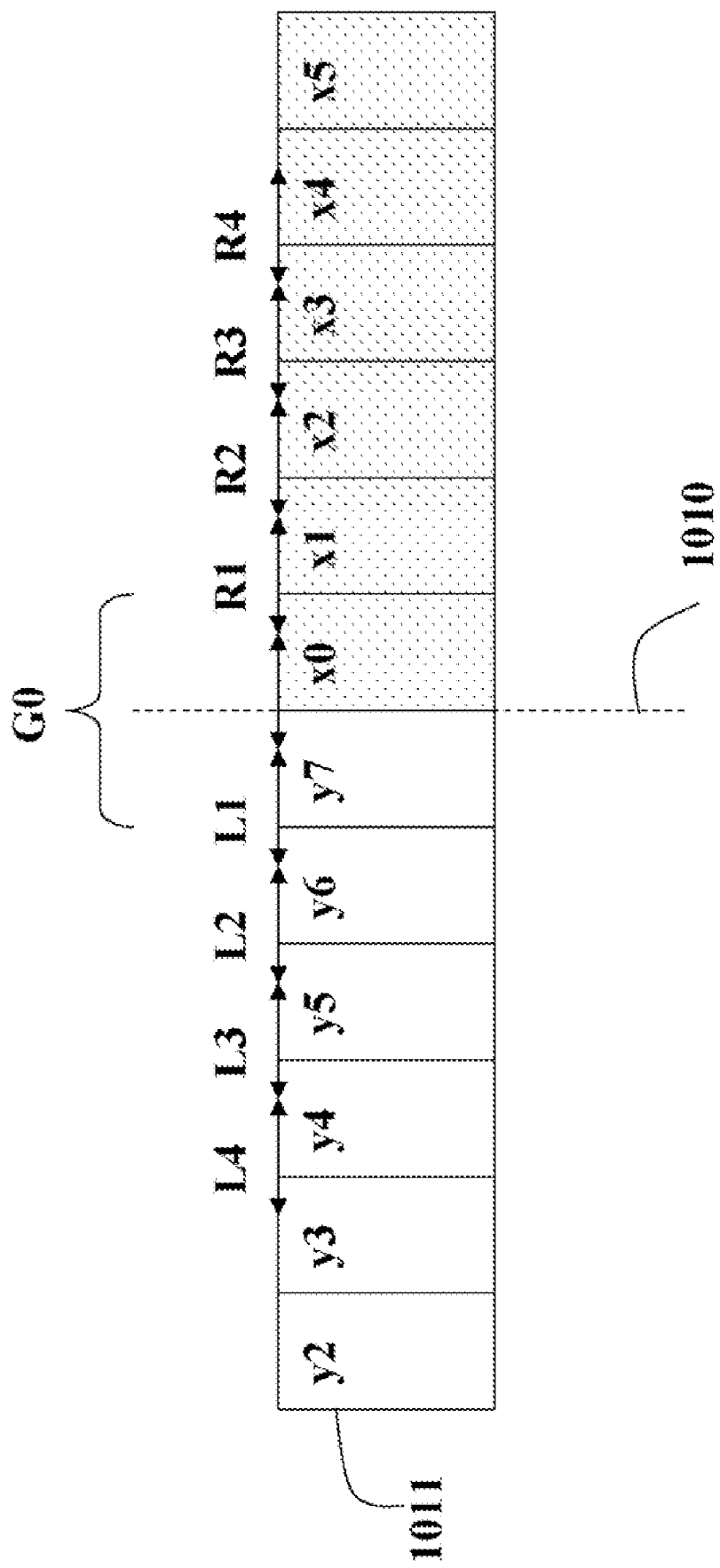
FIG. 10 is a block diagram of vertical blocking artifacts detection.

As shown in FIG. 10, vertical blocking artifacts detection is performed along each vertical block boundary 101 of an 8×8 row of pixels 1011 crossing the boundary. A difference in pixel intensities, G0, is determined by $G0=|x0-y7|$. Then, a difference between the intensity of each pair of adjacent pixels on the left and right-hand side of the block boundary are also determined, as denoted by L1, L2, L3, L4 and R1, R2, R3, R4, respectively. If $$\max(L1, L2, L3, L4) < G0, \text{ or } \max(R1, R2, R3, R4) < G0,$$

then the row is marked, and a boundary gap is detected along the row.

After checking all eight pairs of boundary pixels in the row 1011 along the vertical boundary 1010 of the block, if the number of the marked rows (or boundary gaps) is greater than a predetermined threshold TH1, e.g. TH1=0, a blocking artifact is detected at the current block vertical boundary, and 1-D adaptive fuzzy filtering is performed across this boundary to reduce vertical blocking artifacts, otherwise filtering is skipped.

Reducing Vertical Blocking Artifact

Figure 11:
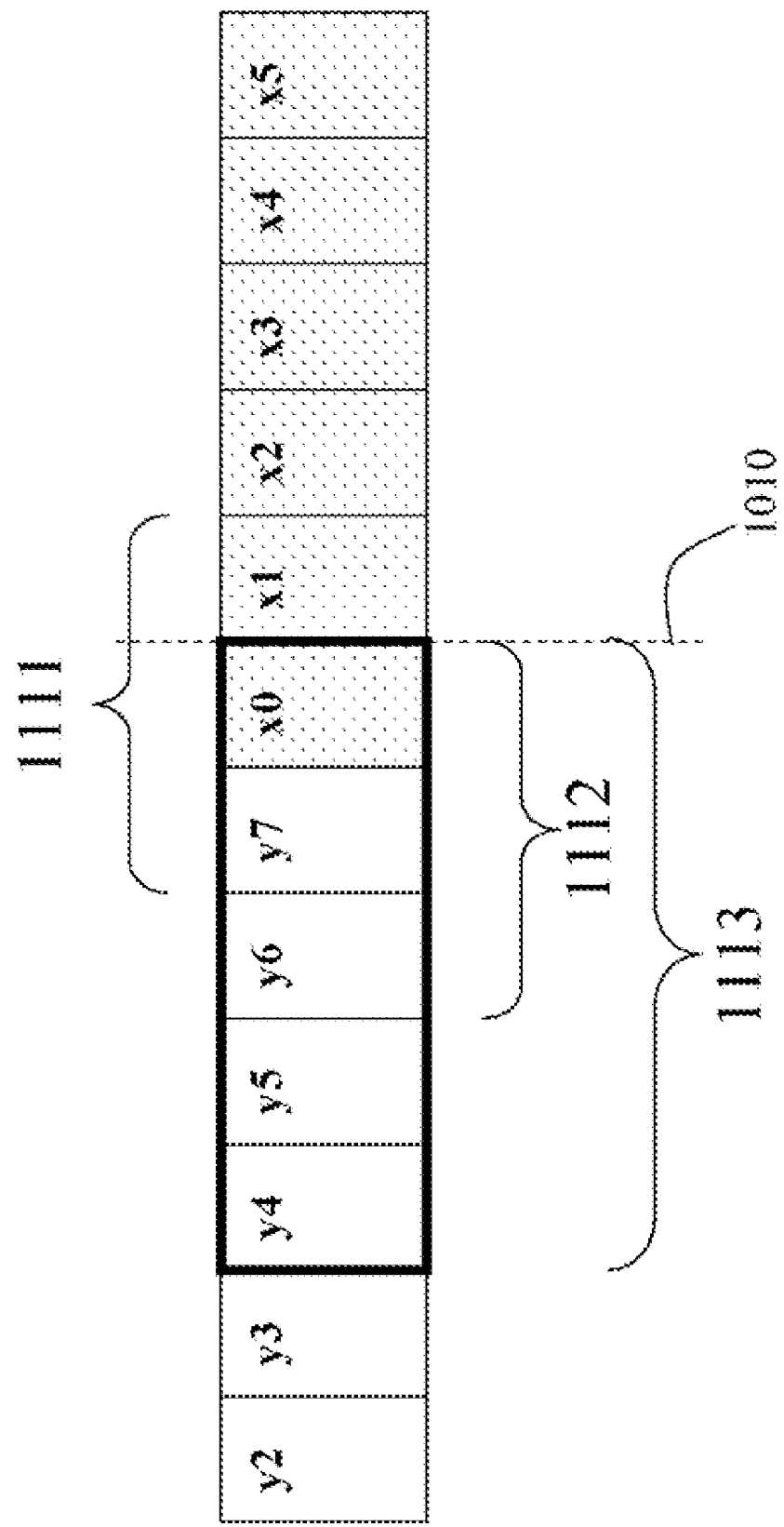
FIG. 11 is a block diagram of vertical blocking artifacts reduction.

As shown in FIG. 11, the 1-D filtering is performed only in the marked row cross the block boundary. If $$MAX(L1, L2, L3, L4) < G0,$$

which means the boundary gap is evident compared with the differences between the adjacent pixels at the left-hand side, then the pixels 1111, y6, y7 and x0, are filtered. Similarly, if $$MAX(R1, R2, R3, R4) < G0,$$

then the pixels 1112, y7, x0 and x1, are filtered.

Note that when the difference of intestates between a pair of adjacent pixels on one side of the boundary is greater than the boundary gap, which is very likely caused by an edge in the input image, a boundary gap is probably not present, and filtering is not necessary on this side of the row. This also helps preserve edges in the image, while still filtering blocking artifacts that appear as edges.

1-D Fuzzy Filter

The filter used for smoothing the vertical blocking artifact is a five-tap fuzzy filter 1113 centered at each pixel to be filtered, e.g., y6. The fuzzy filter preserves strong-edges that lie along the block boundary.

The output of the 1D fuzzy filter is:

$$y = \frac{\sum_{j=1}^{N} \hat{w}_j x_j}{\sum_{j=1}^{N} \hat{w}_j},$$

where $\hat{w}_j = \mu_L (|x_j - x_c|)$, $x_c$ is the center pixel in the filter window, and $\mu_L(\cdot)$ is a piece-wise linear function defined as follows $$\mu_L(x) = \begin{cases} 32, & 0 \leq x \leq 12 \\ -x \cdot 2/3 + 40, & 12 < x < 60, \\ 0, & i \geq 60 \end{cases} \quad (11)$$

Detecting Horizontal Blocking Artifacts

Figure 12:
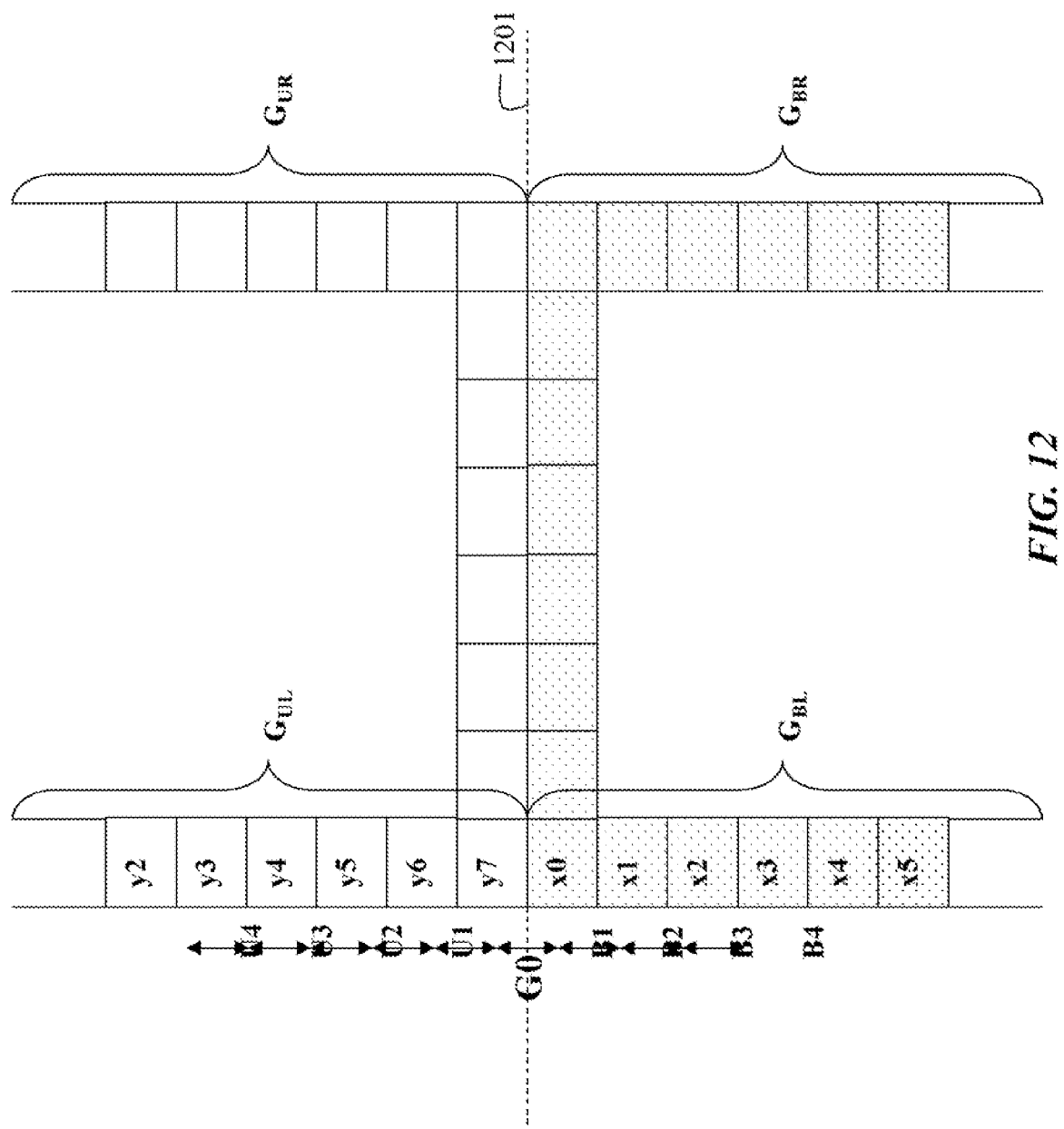
FIG. 12 is a block diagram of horizontal blocking artifacts detection.

FIG. 12 shows how horizontal blocking artifacts are detected in a column of pixels crossing a horizontal block boundary 1201. G0 is a difference between image intensities of a pair of boundary pixels, i.e., G0=|x0−y7|, and U1, U2, U3, U4 and B1, B2, B3, B4 are the intensity differences between each pair of adjacent pixels in the upper side and bottom side of the horizontal boundary. $G_{UL}$, $G_{UR}$, $G_{BL}$ and $G_{BR}$ are the number of vertical boundary gaps at adjacent upper-left, upper-right, bottom left and bottom-right vertical boundaries, respectively.

The horizontal blocking artifact detection is performed along each horizontal boundary of an 8×8 block. The method is similar to that used for detecting the vertical blocking artifact, but additional conditions need to be satisfied before a horizontal blocking artifact is identified. The reason for adding these conditions is to detect the blocking artifact more precisely and avoid filtering across horizontal edges in the image that may exist along the block boundary. Filtering these real edges would result in annoying artifacts.

First, the horizontal boundary gaps are detected and counted using the same method for detecting and counting the vertical boundary gaps. However, now all operations are performed in each column across the current horizontal boundary. If the number of the horizontal boundary gaps detected along the current horizontal boundary is less than a predetermined threshold TH2, e.g. TH2=5, filtering is not be performed across this boundary. Otherwise, the four vertical block boundaries adjacent to the current horizontal boundary, i.e., the upper-left, upper-right, bottom-left and bottom-right, are checked to see whether severe vertical blocking artifacts occur around the current horizontal boundary.

Let $G_{UL}$, $G_{UR}$, $G_{BL}$, $G_{BR}$ denote the number of boundary gaps detected at the upper-left, upper-right, bottom-left and bottom-right vertical boundary, respectively. If at least one of the following conditions is satisfied, then we presume that horizontal blocking artifact occurs at the current horizontal boundary, because severe vertical blocking artifacts are also detected.

Conditions $(G_{UL} > TH2)$ and $(G_{UR} > TH2)$ $(G_{BL} > TH2)$ and $(G_{BR} > TH2)$ $(G_{UL} > 7)$ or $(G_{UR} > 7)$ or $(G_{BL} > 7)$ or $(G_{BR} > 7)$ Because the vertical boundaries are processed before the horizontal boundaries, the number of the vertical boundary gaps at each vertical boundary is already known.

Reducing Horizontal Blocking Artifact

Figure 13:
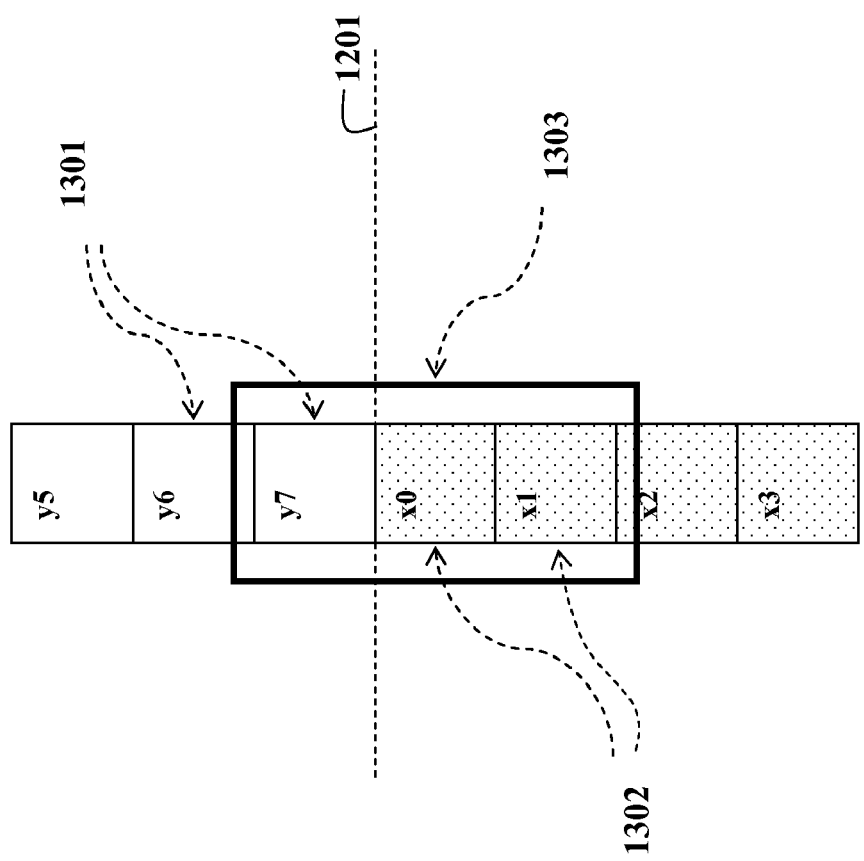
FIG. 13 is a block diagram of horizontal blocking artifacts reduction.

As shown in FIG. 13, the 1-D filtering is performed only in the marked column across the horizontal block boundary. When MAX(U1, U2, U3, U4)<G0, which means the boundary gap is evident compared with the differences between the adjacent pixels at the upper side, the pixels 1301, y6, y7, are filtered.

Similarly, if MX(B1, B2, B3, B4)<G0, then the pixels 1302, x0, x1, are filtered. Note that only one boundary pixel (x0 or y7) is filtered for each side, which is different from filtering across the vertical boundary, where both x0 and y7 are filtered for either side. This reduces the filtering across the horizontal edges. The filter used for smoothing the horizontal blocking artifact is the three-tap fuzzy filter 1303 centered at each pixel to be filtered. The filter weights are decided using equation (11).

Block Classification

As described above, block classification can significantly image local artifacts without reducing the overall quality of the image. However, there are a number of other imaging applications that can also benefit from block classification. For example, if blocks are appropriately classified a higher overall compression rates can be achieved by applying different compression rates and techniques to different blocks. For example, higher compression rates and simpler compression techniques can be applied to smooth blocks, so that additional bandwidth and more sophisticated compression can be applied to blocks with more complex textures. Similarly, the efficiency of pattern recognition and object tracking can be improved by first discarding 'uninteresting' blocks. In addition, the classified blocks can be used selectively by an image retrieval system accelerate content searching and browsing.

Therefore, the invention provides the following block classification technique.

Figure 14:
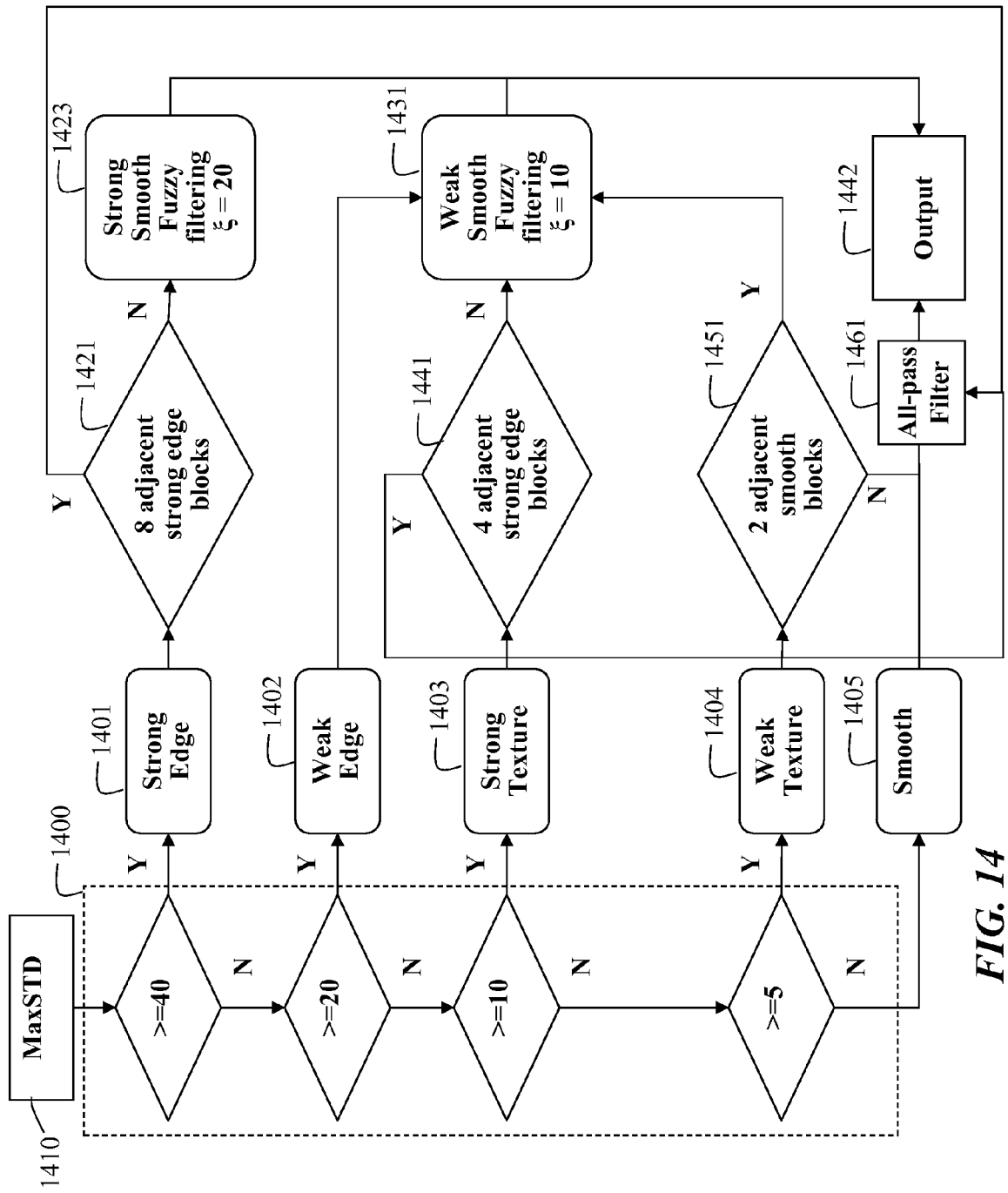
FIG. 14 is a block diagram of pixel classification and filtering according to the invention.

FIG. 14 shows another method for classifying pixels in blocks according to the invention. The image 201 is divided into non-overlapping 8×8 blocks as described above. The variance of each pixel is determined, as described above, in the variance image 401. Then, the pixel with the maximum variance is used determine the classification of the block. Each block is classified into one of the five categories: strong-edge 1401, weak-edge 1402, strong-texture 1403, weak-texture 1404, and smooth 1405, according to MaxSTD 1401 ranges 1400.

$$MaxSTD \begin{cases} \in [40, +\infty) & \Rightarrow StrongEdge \\ \in [20, 40) & \Rightarrow WeakEdge \\ \in [10, 20) & \Rightarrow StrongTexture \\ \in [5, 10) & \Rightarrow WeakTexture \\ \in [0, 5) & \Rightarrow Smooth \end{cases}$$

Block Filtering

For a progressive video, the filtering is performed for each block in each image, and for an interlaced video, the filtering is performed on the blocks in each field. The filter for each block is selected according to the classification of the block and the classification of adjacent blocks, as shown in FIG. 14. Furthermore, the filtering is adaptive in that the spread parameter of the filter is proportional to the maximum variance or maximum standard deviation, i.e., a larger maximum standard deviation results in a larger spread parameter.

Strong-edge Block 1401: If the eight neighboring blocks 1421 (top, bottom, left, right, top-left, top-right, bottom-left, bottom-right) are all strong-edge blocks, perform all-pass filtering 1461 and output 1442 the block, otherwise each pixel is filtered 1423 by an adaptive fuzzy filter, with a spread parameter $\xi$ is twenty, that is strong smooth fuzzy filtering, and output the block.

Weak-edge Block 1402: Each pixel is filtered 1431 by the adaptive fuzzy filter with the spread parameter $\xi$ set to ten, which is a weak smooth fuzzy filtering, and output the block.

Strong-texture Block 1403: If the four adjacent blocks 1441 (top, bottom, left, right) are all strong-edge blocks, all-pass filter and output. Otherwise, each pixel is filtered 1431 by the fuzzy filter with the spread parameter $\xi$ set to ten.

Weak-texture Bock 1404: If at least two of the four adjacent blocks 1451 (top, bottom, left, right) are smooth block, each pixel is filtered 1431 by the adaptive fuzzy filter with the spread parameter $\xi$ set to ten. Otherwise, the all-pass filter 1461 is applied to produce output 1442.

Smooth Block 1405: If the block is a smooth block then apply the all-pass filter 1461, and output 1442 the block.

Figure 15B:
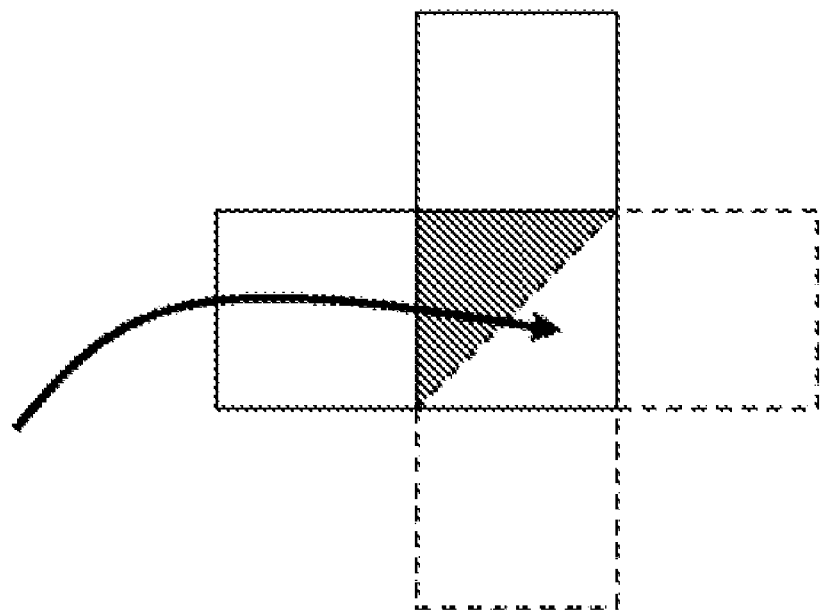
FIG. 15B is a block diagram of an edge block surrounded by at least two smooth blocks.
Figure 15A:
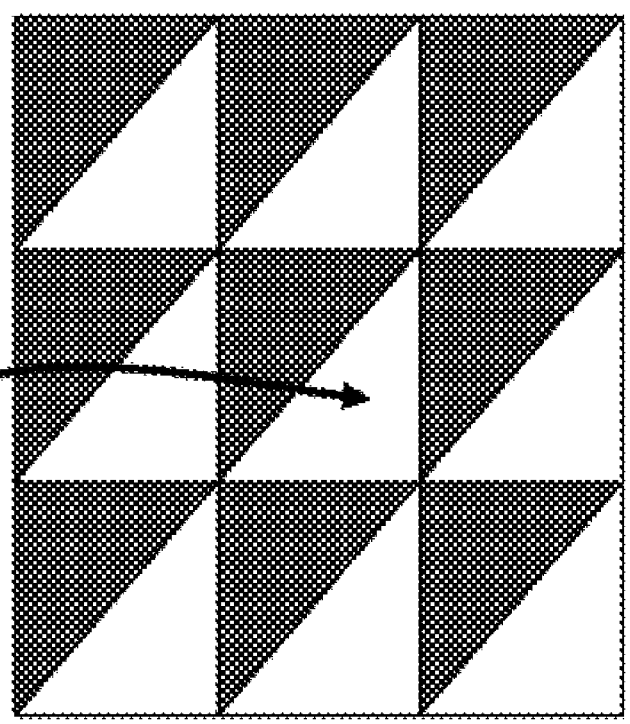
FIG. 15A is a block diagram of an edge block surrounded by eight adjacent edge blocks.

As shown in FIG. 15A, filtering of a strong-edge block 1501 can be skipped when the block is completely surrounded by other strong-edge blocks. This is because ringing artifacts do not appear prominent in a large region of strong-edges due to masking effects. Secondly, because minor artifacts only appear prominent in a smooth region, a weak-edge block 1502 only needs to be filtered when there are adjacent smooth blocks. Filtering in the texture blocks can be optional, and can be selected depending on the compression rate. If the compression ratio is high, e.g., the quantizer scale parameter is greater than forty, then it is more likely that ringing artifacts appear in decompressed texture blocks. Therefore, a weak smooth fuzzy filtering should be applied.

Spatio-Temporal Fuzzy Filtering

Figure 17:
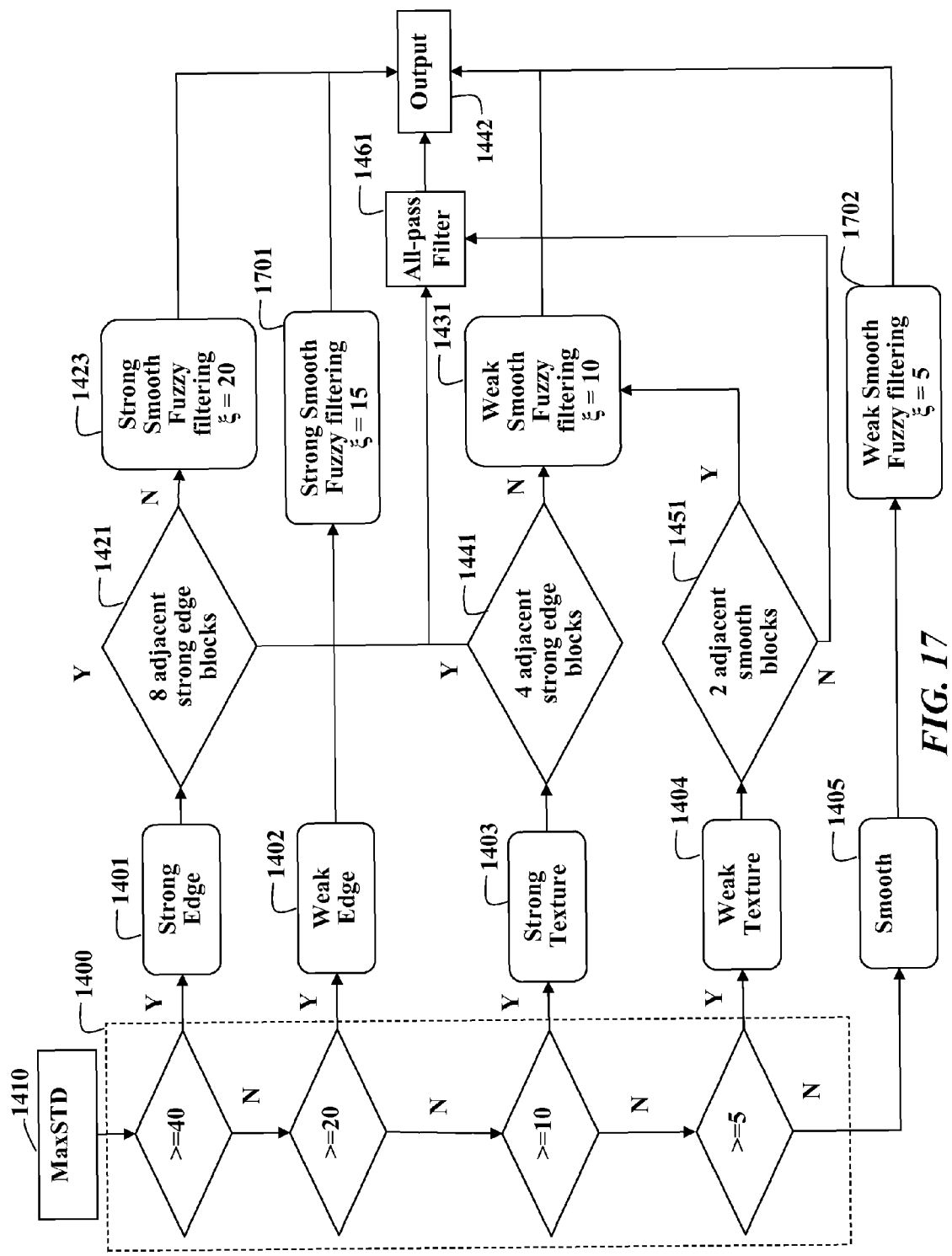
FIG. 17 is a flow diagram of a 3D filtering according to an embodiment of the invention.

FIG. 17 shows the method applying 3D spatio-temporal fuzzy filter to the pixels according to the classification of the blocks and spatially and temporally adjacent pixels. The following sections describe the processing that is additional to that described for FIG. 14.

Weak-edge Block 1402: For a weak-edge block, each pixel in the block is filtered 1701 by the adaptive 3D fuzzy filter with the spread parameter $\xi$ set to fifteen, which is a strong smooth fuzzy filtering, and output 1442 the block.

Smooth Block 1405: If the block is a smooth block, then we apply the 3D adaptive fuzzy filter with the spread parameter $\xi$ set to five, which is a weak smooth fuzzy filtering, and output 1442 the block.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for filtering pixels in a sequence of images, in which each image in the sequence is partitioned into blocks of pixels, and the images are processed sequentially, comprising the steps of:

defining a set of temporally and spatially adjacent pixels to a current pixel with dimension $(T^-+T^++1)\times(2M+1)\times(2N+1)$, where the set includes pixels from $T^-$ previous images, a current image, and $T^+$ next images, within a spatial boundary of $(2M+1)\times(2N+1)$ centered around the current pixel;

determining an energy for each block of pixels in each image, in which the energy of each block is based on variances of intensities of the set of spatially and temporally adjacent pixels in the sequence of images; and calculating, for each pixel in the set of spatially and temporally adjacent pixels, a fuzzy filter weight, where the fuzzy filter weight is associated with each current pixel in each current block and a particular pixel in the set of spatially and temporally adjacent pixels, and the fuzzy filter weight is determined by evaluating a one-dimensional Gaussian membership function at two pixel intensity values including the current pixel and the particular pixel in the set of spatially and temporally adjacent pixels with the energy of the block as a spread parameter; and applying a fuzzy filter to each current pixel in each current block during the sequential processing, where the output of the fuzzy filter is defined as a weighted average of all pixels in the set of spatially and temporally adjacent pixels with associated fuzzy filter weights, to remove blocking and ringing artifacts, wherein the steps of the method are performed by a computer processor.

2. The method of claim 1, in which the temporally adjacent blocks are colocated spatially.

3. The method of claim 1, in which the temporally adjacent blocks are shifted spatially according to a motion vector of the current block.

4. The method of claim 1, in which an output of the fuzzy filter is $$\frac{\sum_{\Delta t=-T^-}^{T^+} \sum_{\Delta m=-M}^{M} \sum_{\Delta n=-N}^{N} I(t, m, n) \times \mu_G(I(t, m, n), I(t + \Delta t, m + \Delta m, n + \Delta n))}{\sum_{\Delta t=-T^-}^{T^+} \sum_{\Delta m=-M}^{M} \sum_{\Delta n=-N}^{N} \mu_G(I(t, m, n), I(t + \Delta t, m + \Delta m, n + \Delta n))},$$

in which $I(t, m, n)$ is the current pixel identified by coordinates t, m, and n, wherein t is a temporal dimension, and m, n are the spatial dimensions of the coordinates, $\Delta$ indicates coordinates of the set of temporally and spatially adjacent pixels to the current pixel, $\mu_G(a,b)$ is the one-dimensional membership function defined by $\mu_G(a,b)=e^{-(a-b)^2/2\sigma^2}$ evaluated at two pixel intensity values a and b within the set of pixels and $\sigma$ is the spread parameter.

5. The method of claim 1, in which the fuzzy filter is applied to motion objects in the sequence of images.

6. The method of claim 1, in which $T^-$ and $T^+$ are different.

7. The method of claim 1, in which the fuzzy filter is applied to chrominance components.

8. The method of claim 1, in which the fuzzy filter is applied to luminance components.

* * * * *